US011216317B1

(12) United States Patent
Shibayama et al.

(10) Patent No.: US 11,216,317 B1
(45) Date of Patent: *Jan. 4, 2022

(54) COMPUTER SYSTEM AND COMPUTER SYSTEM USAGE MANAGEMENT METHOD

(71) Applicant: Hitachi, Ltd., Tokyo (JP)

(72) Inventors: Tsukasa Shibayama, Tokyo (JP); Kazuei Hironaka, Tokyo (JP); Kenta Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,024

(22) Filed: Mar. 25, 2021

Related U.S. Application Data

(63) Continuation of application No. 17/186,543, filed on Feb. 26, 2021.

(30) Foreign Application Priority Data

Oct. 9, 2020 (JP) .............................. JP2020-171539

(51) Int. Cl.
| G06F 9/46 | (2006.01) |
| G06F 9/52 | (2006.01) |
| G06F 3/06 | (2006.01) |
| H04L 29/08 | (2006.01) |

(52) U.S. Cl.
CPC ............ *G06F 9/526* (2013.01); *G06F 3/0613* (2013.01); *G06F 3/0644* (2013.01); *G06F 3/0653* (2013.01); *G06F 3/0673* (2013.01); *H04L 67/2842* (2013.01)

(58) Field of Classification Search
CPC ...... G06F 9/526; G06F 3/0613; G06F 3/0644; G06F 3/0653; G06F 3/0674; H04L 67/2842
See application file for complete search history.

(56) References Cited

U.S. PATENT DOCUMENTS 7,299,322 B2 * 11/2007 Hosouchi .............. G06F 3/0605
   711/111
2015/0127854 A1 5/2015 Yamamoto et al.
2016/0371121 A1 12/2016 Ozaki

FOREIGN PATENT DOCUMENTS

JP 2016-510440 A 4/2016
JP 6235156 B2 11/2017

* cited by examiner

*Primary Examiner* — Diem K Cao
(74) *Attorney, Agent, or Firm* — Baker Botts L.L.P.

(57) ABSTRACT

The computer system includes one or more storage devices and a management computer, the management computer includes an information collection unit, an event detection unit, a plan generation unit, and a plan execution unit. The plan generation unit determines a target volume of a change process of a right of control in a plan, a processor of a change source of the right of control, and a processor of a change destination of the right of control, estimates an influence by a change process of the right of control in the plan, and the plan execution unit determines execution time of the plan based on the estimation of the influence and the operation information of the storage devices. As a result, in consideration of the influence by an ownership change process, while the influence applied to usage of a computer system is suppressed, the ownership change process is executed.

10 Claims, 30 Drawing Sheets

| RESOURCE TYPE | RESOURCE ID | METRIC | VALUE |
|---|---|---|---|
| CPU | CPU1 | TotalBusyTime | 13500 |
| | | TargetBusyTime | 8500 |
| | | UsageRanking[ ] | Vol1:1000, Vol3:500,.. |
| | | ... | |
| | CPU2 | | |
| | ... | | |
| Volume | Vol1 | SequentialReadIoCount | 100 |
| | | SequentialWriteIoCount | 10 |
| | | RandomReadIoCount | 50 |
| | | RandomWriteIoCount | 40 |
| | | SequentialReadHitIoCount | 10 |
| | | RandomReadHitIoCount | 5 |
| | | ReadAccumulatedResponseTime | 12000 |
| | | WriteAccumulatedResponseTime | 6000 |
| | | SequentialReadBlockCount | 10 |
| | | SequentialWriteBlockCount | 100 |
| | | RandomReadBlockCount | 50 |
| | | RandomWriteBlockCount | 50 |
| | | ... | 40 |
| | Vol2 | | |
| | ... | | |
| Cache | Cache1 | WritePendingRate | 20% |
| | ... | | |
| ... | | | |

| DEVICE SERIAL NUMBER (12601) | DEVICE MODEL (12602) | RESOURCE TYPE (12603) | RESOURCE ID (12604) | RELATED RESOURCE (12605) | SPECIFICATION (12606) | ATTRIBUTE (12607) |
|---|---|---|---|---|---|---|
| 001 | Model A | CPU | CPU1 | - | 4.0GHz | |
| | | | CPU2 | - | 4.0GHz | |
| | | | ... | | | |
| | | Cache | Cache1 | - | 128GB | |
| | | | Cache2 | - | 128GB | |
| | | | ... | | | |
| | | Port | Port1 | - | 100GB/sec | |
| | | | Port2 | - | 100GB/sec | |
| | | | ... | | | |
| | | Drive | Drive1 | Pool1 | 1TB MLC | |
| | | | Drive2 | Pool1 | 1TB MLC | |
| | | | ... | | | |
| | | Pool | Pool1 | - | 1.5TB | |
| | | | Pool2 | - | 15TB | |
| | | | ... | | | |
| | | Volume | Vol1 | Pool1 | 1TB | COMPRESSION |
| | | | Vol2 | Pool2 | 5TB | COPY (Vol4) |
| | | | Vol3 | Pool2 | 5TB | |
| | | | ... | | | |
| | | ... | | | | |

| CPU_ID | VolumeID | CACHE MANAGEMENT POINTER | STATE |
|---|---|---|---|
| CPU1 | | | IN EXECUTION |
| CPU2 | | | NORMAL |
| ... | | | |

| ID | ORGANIZATION CODE | TYPE | NAME |
|---|---|---|---|
| 1 | Org1 | Customer | ABC |
| 2 | Org2 | Customer | DEF |
| 3 | Org3 | Partner | XYZ |
| ... | | | |

FIG. 11

| ORGANIZATION ID | DEVICE SERIAL NUMBER | DEVICE MODEL | NAME | STATE |
|---|---|---|---|---|
| 1 | 001 | Model A | Storage A | Online |
| 1 | 002 | Model B | Storage B | Offline |
| 2 | | | | |
| ... | | | | |

FIG. 12

| 22301 | 22302 | 22303 | 22304 | 22305 | 22306 | 22307 | 22308 |
|---|---|---|---|---|---|---|---|
| ORGANIZATION ID | DEVICE SERIAL NUMBER | DEVICE MODEL | RESOURCE TYPE | RESOURCE ID | RELATED RESOURCE | SPECIFICATION | ATTRIBUTE |
| 1 | 001 | Model A | CPU | CPU1 | - | 4.0GHz | |
| | | | | CPU2 | - | 4.0GHz | |
| | | | | ... | | | |
| | | | Cache | Cache1 | - | 128GB | |
| | | | | Cache2 | - | 128GB | |
| | | | | ... | | | |
| | | | Port | Port1 | - | 100GB/sec | |
| | | | | Port2 | - | 100GB/sec | |
| | | | | ... | | | |
| | | | Drive | Drive1 | Pool1 | 1TB MLC | |
| | | | | Drive2 | Pool1 | 1TB MLC | |
| | | | | ... | | | |
| | | | Pool | Pool1 | - | 1.5TB | |
| | | | | Pool2 | - | 15TB | |
| | | | | ... | | | |
| | | | Volume | Volume 1 | Pool1, CPU1 | 1TB | |
| | | | | Volume 2 | Pool2, CPU2 | 5TB | COMPRESSION |
| | | | | Volume 3 | Pool2, CPU1 | 5TB | COPY(Vol4) |
| | | | | ... | | | |
| | | | ... | | | | |

| ORGANI-ZATION ID | DEVICE SERIAL NUMBER | DEVICE MODEL | RESOURCE TYPE | RESOURCE ID | TIME | METRIC | VALUE |
|---|---|---|---|---|---|---|---|
| 1 | | | CPU | CPU1 | 10:00:00 | TotalBusyRate | 30% |
| | | | | | | TargetBusyRate | 20% |
| | | | | | | UsageRanking[ ] | Vol1:10%, Vol3:5%,.. |
| | | | | | | ... | |
| | | | | | ... | | |
| | | | | CPU2 | | | |
| | | | | ... | | | |
| | | | Volume | Vol1 | 10:00:00 | SequentialReadIOPS | 100 |
| | | | | | | SequentialWriteIOPS | 10 |
| | | | | | | RandomReadIOPS | 50 |
| | | | | | | RandomWriteIOPS | 40 |
| | | | | | | SequentialReadHitIOPS | 10 |
| | | | | | | RandomReadHitIOPS | 5 |
| | | | | | | ReadResponseTime | 200 |
| | | | | | | WriteResponseTime | 100 |
| | | | | | | SequentialReadTransferRate | 300 |
| | | | | | | SequentialWriteTransferRate | 100 |
| | | | | | | RandomReadTransferRate | 50 |
| | | | | | | RandomWriteTransferRate | 50 |
| | | | | | | ... | 40 |
| | | | | Vol2 | | | |
| | | | | ... | | | |
| | | | Cache | Cache1 | | | |
| | | | | ... | | | |
| | | | ... | | | | |

| ORGANIZATION ID | DEVICE SERIAL NUMBER | DEVICE MODEL | CPU_ID | TIME | Rank | VolumeID | BusyRate InPercent |
|---|---|---|---|---|---|---|---|
| | | | CPU1 | 10:00:00 | 1 | Vol1 | 15 |
| | | | | | 2 | Vol3 | 10 |
| | | | | | ... | | |
| | | | | ... | | | |
| | | | CPU2 | | | | |
| | | | ... | | | | |
| | | | | | | | |
| | | | | | | | |

| | 22601 | 22602 | 22603 | 22604 | 22605 | 22606 | 22607 | 22608 |
|---|---|---|---|---|---|---|---|---|
| | ID | ORGANIZATION ID | DEVICE SERIAL NUMBER | DEVICE MODEL | THRESHOLD VALUE | MINIMUM DETECTION INTERVAL | DETECTION PERIOD | DETECTION NUMBER |
| | 1 | 1 | 001 | Model A | 45% | 1hour | 5days | 30 |
| | 2 | 2 | | | | | | |
| | ... | | | | | | | |

FIG. 16

| ID | ORGANIZATION ID | DEVICE SERIAL NUMBER | DEVICE MODEL | CPU_ID | THRESHOLD VALUE | ANOMALY OCCURRENCE TIME | USAGE RATE |
|---|---|---|---|---|---|---|---|
| 1 | 1 | 001 | Model A | CPU1 | 40% | 10:00:00 | 50% |
| 2 | 2 | | | | | | |
| ... | | | | | | | |

| | 22801 | 22802 | 22803 | 22804 | 22805 | 22806 | 22807 |
|---|---|---|---|---|---|---|---|
| | ID | ORGANIZATION ID | DEVICE SERIAL NUMBER | DEVICE MODEL | OCCURRENCE TIME | UPDATE TIME | RESOLVED |
| | 1 | 1 | 001 | Model A | 10:00:00 | - | No |
| | 2 | 1 | 002 | Model B | 10:00:05 | 11:00:00 | Yes |
| | 3 | 2 | | | | | |
| | ... | | | | | | |

FIG. 18

| ID | EVENT ID | DEVICE SERIAL NUMBER | DEVICE MODEL | STATE | PLAN REGISTRATION TIME | PLAN CHANGE TIME | PREDICTED PROCESSING TIME | I/O INFLUENCE PREDICTION | CPU INFLUENCE PREDICTION | USER-SPECIFIED CONDITION | SCHEDULED EXECUTION TIME | PROHIBITED EXECUTION TIME |
|---|---|---|---|---|---|---|---|---|---|---|---|---|
| 1 | 1 | 001 | Model A | Scheduled | 10:05:00 | - | 15min | 10% | 10% | PROHIBITED TIME | - | 4:00-7:00 |
| 2 | 1 | 002 | Model B | Scheduled | 0:00:00:00 | - | 20min | 10% | 10% | DESIRED TIME | 4:00:00 | - |
| ... | | | | | | | | | | | | |

| ID | PLAN ID | DEVICE SERIAL NUMBER | DEVICE MODEL | HANDLING NAME | CHANGE SOURCE CPU | CHANGE TARGET VOLUME | CHANGE DESTINATION CPU |
|---|---|---|---|---|---|---|---|
| 1 | 1 | 001 | Model A | OWNERSHIP CHANGE | CPU1 | Vo1 | CPU2 |
| 2 | 1 | 001 | Model A | OWNERSHIP CHANGE | CPU1 | Vol3 | CPU2 |
| ... | | | | | | | |

| DEVICE SERIAL NUMBER | DEVICE MODEL | RESOURCE TYPE | RESOURCE ID | RELATED RESOURCE | SPECIFICATION | ATTRIBUTE |
|---|---|---|---|---|---|---|
| 001 | Model A | Node | Node1 | - | - | |
| | | | ... | - | - | |
| | | CPU | CPU1 | Node1 | 4.0GHz | |
| | | | CPU2 | Node2 | 4.0GHz | |
| | | | ... | | | |
| | | Cache | Cache1 | Node1 | 128GB | |
| | | | Cache2 | Node1 | 128GB | |
| | | | ... | | | |
| | | Port | Port1 | Node1 | 100GB/sec | |
| | | | Port2 | Node1 | 100GB/sec | |
| | | | ... | | | |
| | | Drive | Drive1 | Node1, Pool1 | 1TB MLC | |
| | | | Drive2 | Node1, Pool1 | 1TB MLC | |
| | | | ... | | | |
| | | Pool | Pool1 | - | 1.5TB | |
| | | | Pool2 | - | 15TB | |
| | | | ... | | | |
| | | Volume | Vol1 | Pool1 | 1TB | |
| | | | Vol2 | Pool2 | 5TB | COMPRESSION |
| | | | Vol3 | Pool2 | 5TB | COPY(Vol4) |
| | | | ... | | | |
| | | ... | | | | |

Columns: 12601', 12602', 12603', 12604', 12605', 12606', 12607' (126')

| | | | | | | 22307' | 22308' |
| 22301' | 22302' | 22303' | 22304' | 22305' | 22306' | | |
|---|---|---|---|---|---|---|---|
| ORGANI-ZATION ID | DEVICE SERIAL NUMBER | DEVICE MODEL | RESOURCE TYPE | RESOURCE ID | RELATED RESOURCE | SPECIFICATION | ATTRIBUTE |
| 1 | 001 | Model A | Node | Node1 | | | |
| | | | | ... | | | |
| | | | CPU | CPU1 | Node1 | 4.0GHz | |
| | | | | CPU2 | Node2 | 4.0GHz | |
| | | | | ... | | | |
| | | | Cache | Cache1 | Node1 | 128GB | |
| | | | | Cache2 | Node1 | 128GB | |
| | | | | ... | | | |
| | | | Port | Port1 | Node1 | 100GB/sec | |
| | | | | Port2 | Node1 | 100GB/sec | |
| | | | | ... | | | |
| | | | Drive | Drive1 | Node1, Pool1 | 1TB MLC | |
| | | | | Drive2 | Node1, Pool1 | 1TB MLC | |
| | | | | ... | | | |
| | | | Pool | Pool1 | - | 1.5TB | |
| | | | | Pool2 | - | 15TB | |
| | | | | ... | | | |
| | | | Volume | Volume1 | Pool1, CPU1 | 1TB | |
| | | | | Volume2 | Pool2, CPU2 | 5TB | COMPRESSION |
| | | | | Volume3 | Pool2, CPU1 | 5TB | COPY(Vol4) |
| | | | | ... | | | |
| | | | ... | | | | |

COMPUTER SYSTEM AND COMPUTER SYSTEM USAGE MANAGEMENT METHOD

BACKGROUND OF THE INVENTION

1. Field of the Invention

The present invention relates to a computer system and a computer system usage management method, and is suitable to be applied to the computer system and the computer system usage management method for changing a right of control (ownership) of volumes between a plurality of processors in one or more storage devices that provide the volumes.

2. Description of Related Art

In recent years, in order to reduce the operational costs of computer systems or the like, automation of operational management handling has progressed, and a technique causing operational management for collecting, analyzing, and dealing with configuration information and operation information of storage devices to be more sophisticated or easier is widespread. Particularly, in the operational management of storage devices, advanced operational skills are required to monitor the performance load and take appropriate measures. Therefore, various technologies for facilitating the operational management are disclosed.

For example, JP6235156B discloses a technique for collecting operation information from a storage device to monitor loads and generating and executing a configuration change proposal for changing the right of control (ownership) from processors with higher loads to processors with lower loads when loads between processors become imbalanced in the storage device. For example, JP-A-2016-510440A discloses changing ownership of volumes included in a processor to an appropriate processor, if a configuration change such as addition or blockage of a storage device is detected.

By the way, the process of changing the ownership causes loads by itself, but the influence by the process of changing the ownership is not considered in the related art described above, and thus it is concerned that a problem may occur during the change. Further, in the related art described above, at the time when the ownership change process is executed, influence on operational management of a computer system due to the operation of an application or user handling is not considered, and for example, it is likely that an unintended ownership change process may be executed at the time that is not intended by the user.

SUMMARY OF THE INVENTION

The present invention has been made in consideration of the above points, and is to provide a computer system and a computer system usage management method in which, if an imbalance of loads is generated in a plurality of processors of a storage device in a computer system, in consideration of the influence by an ownership change process, while the influence applied to operational management of the computer system is suppressed, the ownership change process can be executed.

In order to solve the above problems, the present invention provides a computer system including one or more storage devices that include processors, memories, and cache memories, in which a higher system inputs and outputs data, and that provide one or more volumes configured with one or more memory devices; and a management computer that manages the storage devices, in which the management computer includes an information collection unit that collects usage information including configuration information and operation information in the storage devices, an event detection unit that detects an event indicating imbalance of loads of the processors based on a detection condition from the collected usage information, a plan generation unit that generates a plan for resolving the detected event and changing a right of control of the processor with respect to the volume, and a plan execution unit that executes the generated plan, the operation information includes information indicating operation history of the processors, the volumes, and the cache memories in the storage devices, the plan generation unit determines a target volume of a change process of the right of control in the plan, a processor of a change source of the right of control, and a processor of a change destination of the right of control and estimates an influence by a change process of the right of control in the plan, and the plan execution unit determines execution time of the plan based on the estimation of the influence and the operation information of the storage devices.

In order to solve the above problems, the present invention provides a computer system usage management method performed by a computer system including one or more storage devices that include processors, memories, and cache memories, in which a higher system inputs and outputs data, and that provide one or more volumes configured with one or more memory devices, and a management computer that manages the storage devices, the method including: an information collection step of collecting usage information including configuration information and operation information in the storage devices by the management computer; an event detection step of detecting an event indicating imbalance of loads of the processor based on a detection condition from the usage information collected in the information collection step, by the management computer; a plan generation step of generating a plan for resolving the event detected in the event detection step and changing a right of control of the processor with respect to the volume by the management computer, by the management computer; and a plan execution step of executing the plan generated in the plan generation step, by the management computer, in which the operation information includes information indicating operation history of the processors, the volumes, and the cache memories in the storage devices, in the plan generation step, a target volume of a change process of the right of control in the plan, a processor of a change source of the right of control, and a processor of a change destination of the right of control are determined, and an influence by a change process of the right of control in the plan is estimated, and in the plan execution step, execution time of the plan is determined based on the estimation of the influence and the operation information of the storage devices.

According to the present invention, if an imbalance of loads is generated in a plurality of processors of a storage device in a computer system, in consideration of the influence by an ownership change process, while the influence applied to operational management of the computer system is suppressed, the ownership change process can be executed.

BRIEF DESCRIPTION OF THE DRAWINGS

FIG. 6 is a diagram illustrating an example of operation information 125;

FIG. 7 is a diagram indicating an example of configuration information 126;

FIG. 9 is a diagram indicating an example of cache management information 128;

FIG. 10 is a diagram indicating an example of organization information 221;

FIG. 11 is a diagram indicating an example of device information 222;

FIG. 12 is a diagram indicating an example of device configuration information 223;

FIG. 13 is a diagram indicating an example of operation history information 224;

FIG. 14 is a diagram indicating an example of operation history ranking information 225;

FIG. 15 is a diagram indicating an example of detection information 226;

FIG. 16 is a diagram indicating an example of performance anomaly history information 227;

FIG. 17 is a diagram indicating an example of event information 228;

FIG. 18 is a diagram indicating an example of plan information 229;

FIG. 19 is a diagram indicating an example of job information 230;

FIG. 28 is a diagram illustrating an example of configuration information 126' according to the second embodiment;

FIG. 29 is a diagram illustrating an example of device configuration information 223' according to the second embodiment.

DESCRIPTION OF EMBODIMENTS

Figure 1:
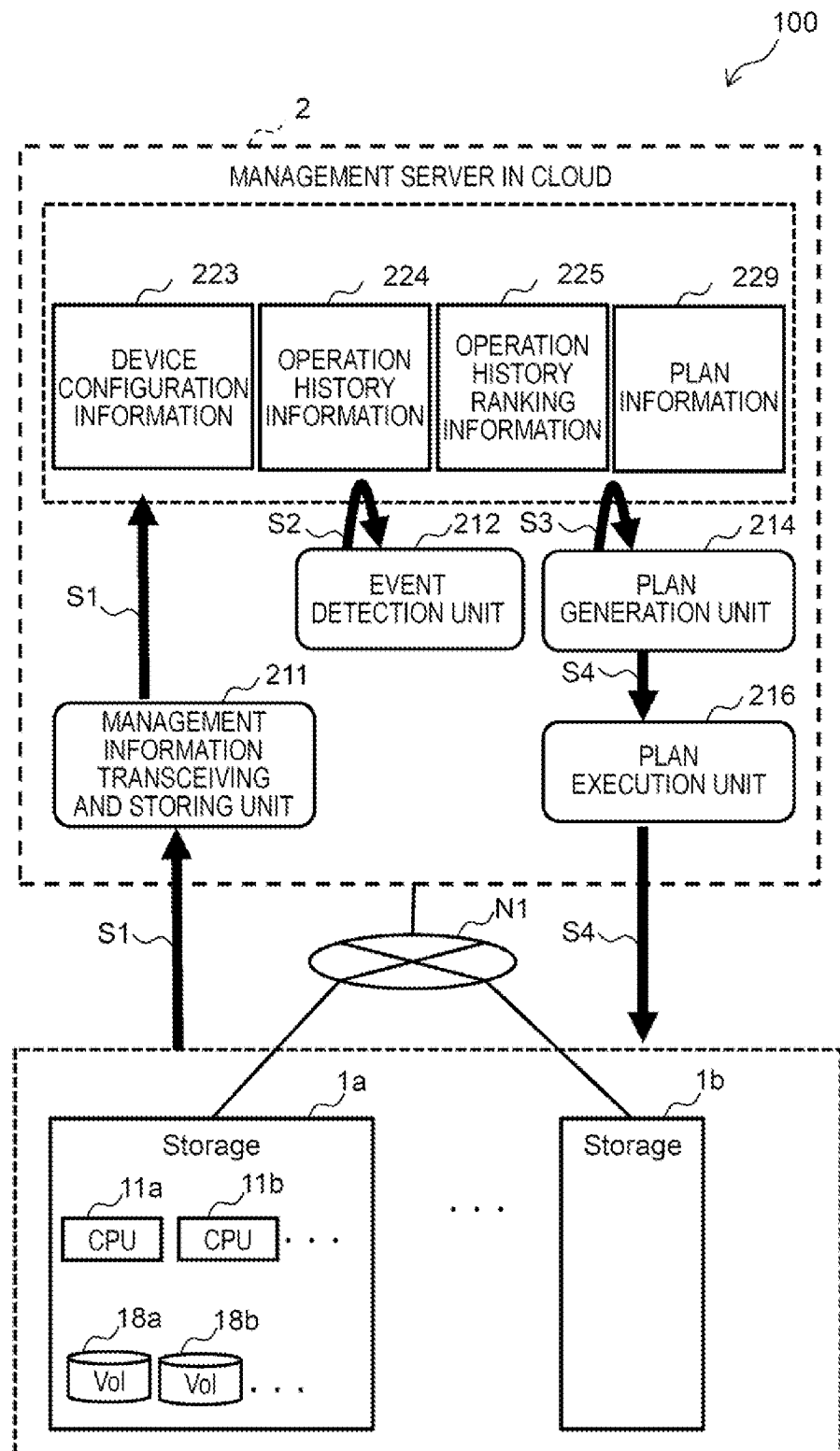
FIG. 1 is a diagram illustrating an overview of a configuration and a process according to a first embodiment of the present invention.

Hereinafter, preferred embodiments of the present invention are described with reference to the drawings. In the following description, the same or similar elements and processes are specified by the same reference numerals to describe the differences, and duplicate description is omitted. Further, in the later embodiment, differences from the existing embodiment are described, and the duplicated description is omitted.

The configurations and processes described in the following description and in each figure exemplify outlines of the embodiments to the extent necessary for understanding and implementing the present invention, and are not intended to limit the embodiments according to the present invention. In addition, each embodiment and each modification can be combined in part or in whole within a consistent range without departing from the gist of the present invention.

In the following description, similar elements with codes that are distinguished by the subscript or branch number added to the number are collectively referred to by the code of the number only, regardless of the subscript or branch number. For example, elements with codes such as "$100a$", "$100b$", "200-1", and "200-2" are collectively referred to by adding codes such as "100" and "200". In addition, similar elements with codes having subscripts or branch numbers added to numbers such as an "XX interface $14a$" and a "YY interface $14b$" are collectively referred to as common parts of the element names and code parts of only numbers such as an "interface 14".

Further, in the following description, various kinds of information is described in a table format, but the information is not limited to the table format and may be in a document format or other format. The structure of the table is an example, and the table can be integrated or distributed as appropriate. Further, in the following description, the IDs and names listed as the items (columns) in each table may be any numbers or character strings as long as the records can be distinguished.

In the following, the process may be described with a "program" as the subject. The program is executed by using a processor (for example, a central processing unit (CPU)), and a process is executed appropriately by using a memory device (for example, a memory), a communication interface device (for example, a communication port), and/or the like. Therefore, the subject of the process may be regarded as a processor. The process described with the program as the subject may be a process executed by a processor or a device having the processor.

Further, the processor that executes the program can also be referred to as a "XXX unit" as a device that realizes the desired processing function. The processor may also include hardware circuits that perform a part or all of the processing. The program may be installed on each controller from a program source. The program source may be, for example, a program distribution computer or a computer-readable storage medium.

(1) First Embodiment

(1-1) Overview

FIG. 1 is a diagram illustrating an overview of a configuration and a process according to a first embodiment of the present invention. A computer system 100 illustrated in FIG. 1 is an example of a computer system of the present embodiment and includes one or more storage devices 1 (individually storage devices $1a$ and $1b$) and a management server 2 in the cloud.

The storage devices 1 each include a plurality of CPUs (individually CPUs $11a$ and $11b$) and volumes 18 (individually volumes 18a and 18b). The storage devices 1a and 1b and the management server 2 in the cloud are communicably connected to each other via a network N1.

The management server 2 is, for example, configured in the cloud and includes a management information transceiving and storing unit 211, an event detection unit 212, a plan generation unit 214, a plan execution unit 216, a device configuration information 223, operation history information 224, operation history ranking information 225, and plan information 229. The management server 2 also includes components other than the above, and all of the components are described below with reference to FIG. 5.

FIG. 1 illustrates Steps S1 to S4 as a general processing procedure of the overall processing in the present embodiment.

Step S1 is a process for collecting usage information such as configuration information or operation information (information collection process). In Step S1, the management information transceiving and storing unit 211 collects configuration information (including information relating to the ownership indicating control relationship between the CPUs 11 and the volume) and operation information in the storage devices 1 from the storage devices 1 and stores the information in the management server 2 in the cloud.

Step S2 is a process for detecting the event based on the usage information collected in Step S1 (detection process). In Step S2, the event detection unit 212 refers to the device configuration information 223, the operation history information 224, and the operation history ranking information 225 and detects an event. Here, the "event" means that the configuration information or the operation information matches with detection condition. The detection condition is the condition for detecting the generation of "performance anomaly" in the storage device 1 and details thereof are described below in the description of FIG. 15.

Step S3 is a process for receiving the detection of the event in Step S2 and generating a plan for dealing with the event (plan generation process). In Step S3, the plan generation unit 214 makes a plan for resolving the event and stores the plan in the plan information 229. Here, the "plan" is information including the processing content, the time information, or the like for resolving the event and includes a process for changing the right of control (ownership) of the volume as a process for resolving the event.

Step S4 is a process for executing the plan generated in Step S3 (plan execution process). In Step S4, the plan execution unit 216 acquires the generated plan and executes the process described in the plan at the appropriate time with respect to the storage device 1.

According to the execution of the processes of Steps S1 to S4, the computer system 100 according to the present embodiment can determine the execution time in consideration of the influence of an ownership change process and can properly execute a process for changing the ownership while decreasing the management cost of the administrator.

(1-2) Configuration

Figure 2:
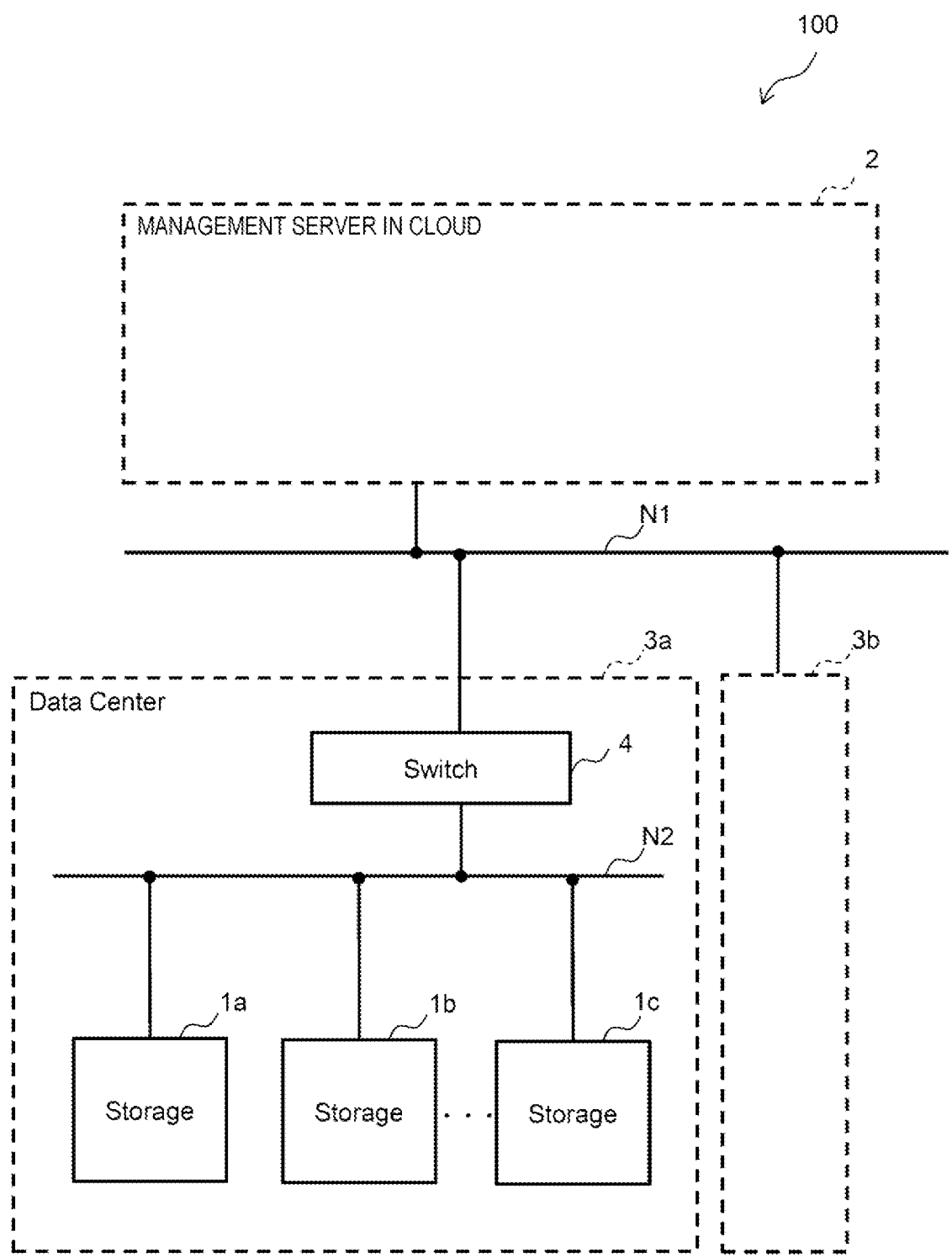
FIG. 2 is a diagram illustrating an overall configuration example of a computer system 100.

FIG. 2 is a diagram illustrating the overall configuration example of the computer system 100. The configuration of the computer system 100 is more specifically illustrated in FIG. 2, than in FIG. 1. The computer system 100 includes the management server 2 on the cloud and a plurality of data centers 3 (individually data centers 3a and 3b). The management server 2 and the data centers 3a and 3b are connected to each other via the network N1 outside the data center.

In FIG. 2, the data centers 3 each include one or more of the storage devices 1 (individually, for example, the storage devices 1a, 1b, and 1c), and a plurality of storage devices in one of the data centers 3 are connected to each other via a network N2 in the data center. The data centers 3 each include a switch 4 for connecting the network N2 in the data center to the network N1 outside the data center. The switch 4 is not necessarily required, and the network N2 in the data center and the network N1 outside the data center may be the same network. These networks N1 and N2 may have a redundant configuration. These networks N1 and N2 may be any communication means such as Ethernet (registered trademark), InfiniBand, or a wireless network. In FIG. 2, the number of the storage devices 1a, 1b, and 1c or the number of the data centers 3a and 3b is a fixed number. However, according to the present embodiment, the number of the storage devices 1 and the number of the data centers 3 are not limited to the above fixed numbers.

The management server 2 in the cloud is a management server that stores management information of the storage devices 1 or stores a program for handling the storage devices 1. For example, the management server 2 collects information from the storage devices 1a, 1b, and 1c via the program, executes the process, or presents the management information to a user (administrator) via a graphical user interface (GUI) to transmit a handling request input from the administrator to the storage devices 1a, 1b, and 1c.

The present embodiment is described as a configuration in which one management server 2 in the cloud collectively manages the plurality of storage devices 1 included in all of the data centers 3. However, for example, the present embodiment may have a configuration in which the plurality of the management servers 2 are present in the cloud or may have a configuration in which the management servers 2 manage data centers, respectively.

Figure 3:
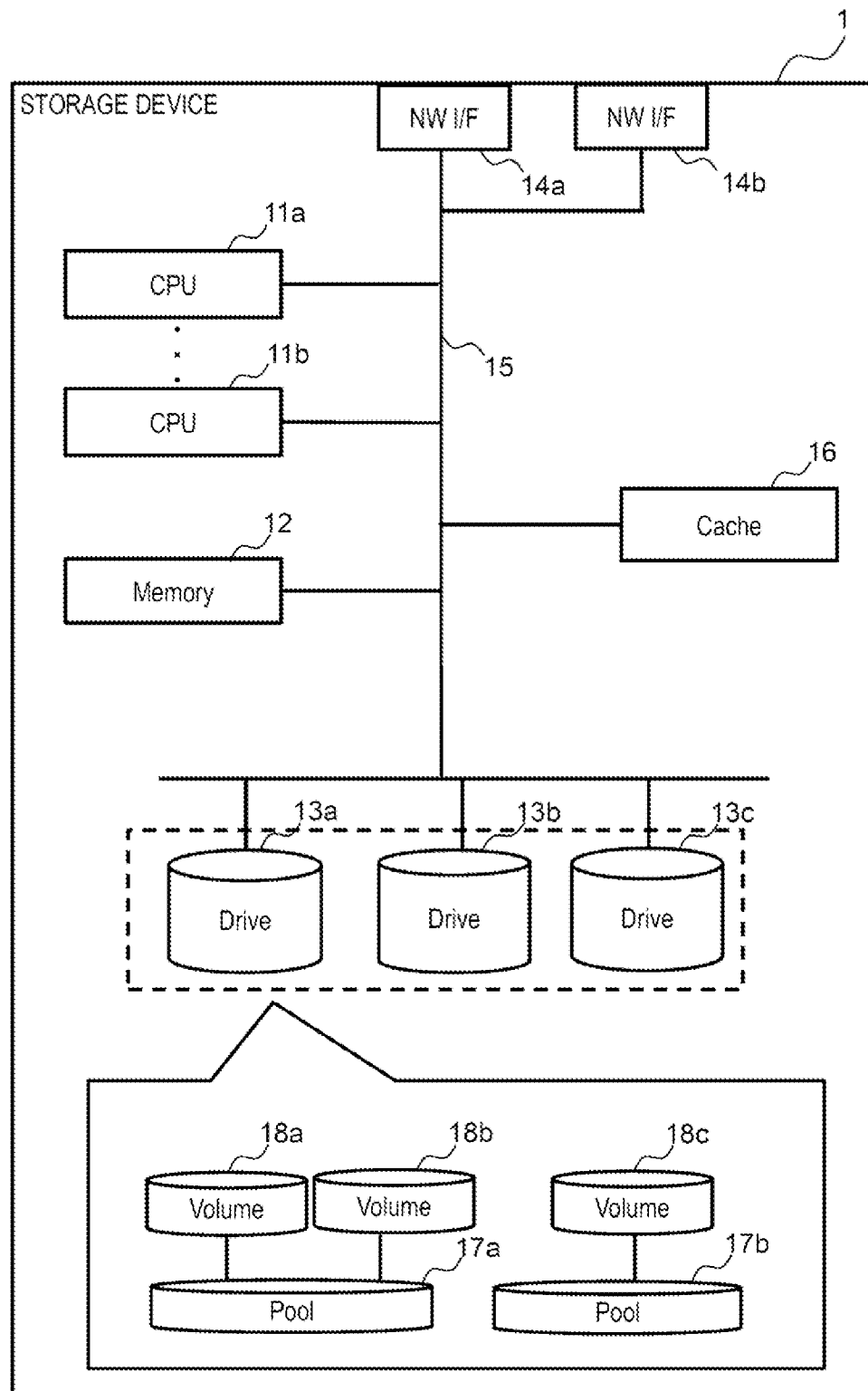
FIG. 3 is a diagram illustrating a configuration example of a storage device 1.

FIG. 3 is a diagram illustrating a configuration example of the storage device 1. As illustrated in FIG. 3, the storage device 1 includes the CPUs 11 (individually the CPUs 11a and 11b) which are an example of a processor, a memory 12 which is an examples of a memory device, drives 13 (individually the drives 13a, 13b, and 13c), and a cache memory 16, and network I/Fs 14 (individually network I/Fs 14a and 14b) which is an example of a communication interface device, and the respective configurations are connected to each other via a bus 15. The storage device 1 includes pools 17 (individually pools 17a and 17b) as a logical area for virtually bundling physical areas of the drives 13 and includes the volumes 18 (individually the volumes 18a, 18b, and 18c) as an area to be logically accessed when data is read or written from or to the pools 17.

In the storage device 1 according to the present embodiment, the numbers of the CPUs 11, the memory 12, and the cache memory 16 are not limited to the numbers illustrated in FIG. 3. The number of the drives 13 and the number of the pools 17 or the volumes 18 which are logical areas are also not limited to the numbers illustrated in FIG. 3. The memory 12 and the cache memory 16 are not always physically divided. A common physical area can be logically divided, and respective divided areas may be used as a memory area or a cache memory area. A plurality of cores may be included in the CPU 11.

The drives 13 are physical storage devices, and specifically may be any one of a hard disk drive (HDD), a solid state drive (SSD), the other nonvolatile memories (for example, Storage Class Memory (SCM), or the like.

The network I/F 14a is an interface that is connected to the network N2 in the data center, and the network I/F 14b is an interface that is connected to a network for input and output (I/O) data (not illustrated) that is connected to a host (not illustrated) that accesses to data. The network I/Fs 14*a* and 14*b* may be any interface such as Fibre Channel or Ethernet. If the network N2 in the data center and network for I/O data are the same, the network I/Fs 14*a* and 14*b* may also be the same. In FIG. 3, the number of each of the network I/Fs 14*a* and 14*b* is one, but the numbers of the network I/Fs 14*a* and 14*b* are not limited thereto.

The bus 15 is an internal bus that connects the CPUs 11, the memory 12, the drives 13, the network I/Fs 14, and the cache memory 16 to each other.

In order to access the data that accesses the drives 13 at a high speed, the cache memory 16 is an area that temporarily caches data and then may be simply referred to as a cache.

Figure 4:
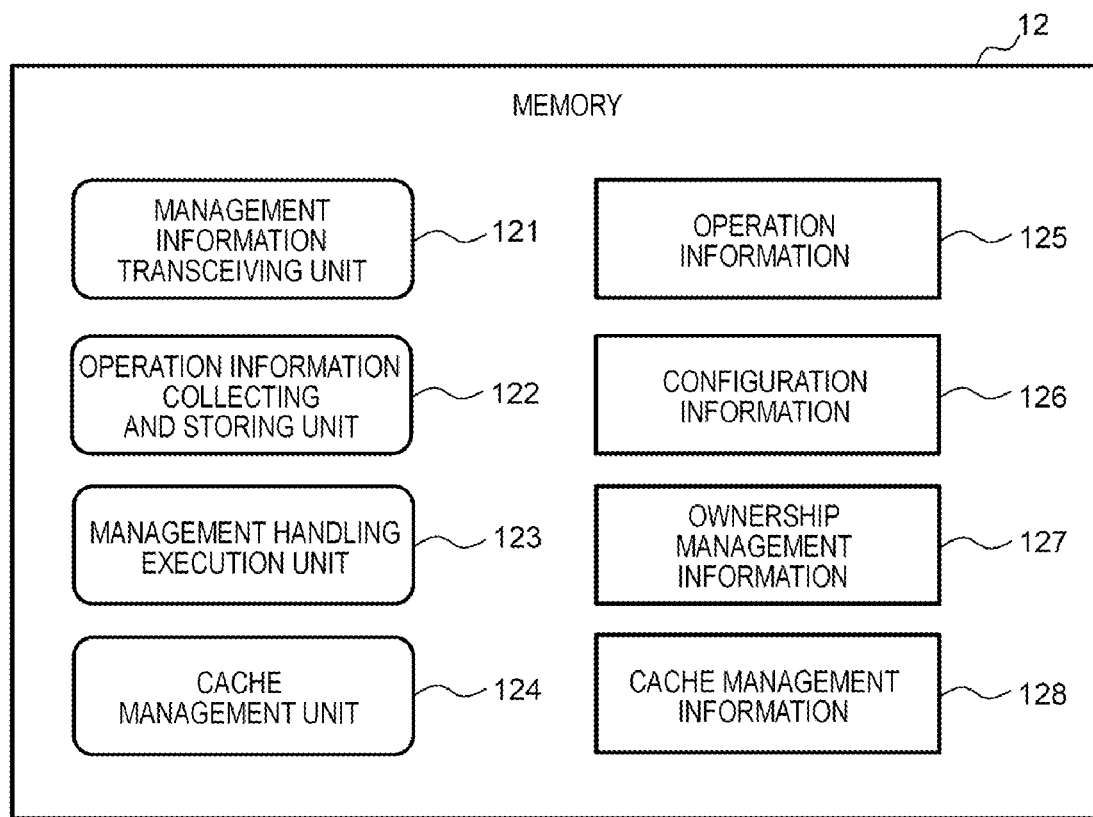
FIG. 4 is a diagram illustrating a program and information on a memory 12 of the storage device 1.

FIG. 4 is a diagram illustrating a program and information on the memory 12 of the storage device 1. As illustrated in FIG. 4, the memory 12 stores a management information transceiving unit 121, an operation information collection and storage unit 122, a management handling execution unit 123, a cache management unit 124, operation information 125, configuration information 126, ownership management information 127, and cache management information 128.

The management information transceiving units 121 are programs that periodically transmit the operation information 125, the configuration information 126, and the ownership management information 127 stored in the storage devices 1*a*, 1*b*, and 1*c* to the management server 2 or receive requests of handling transmitted from the management server 2. The exchange between the management information transceiving unit 121 and the management server 2 may be any one of push or polling.

The operation information collection and storage units 122 are programs that periodically collect I/O amounts by input/output (I/O) processes generated inside the storage devices 1*a*, 1*b*, and 1*c*, data transfer amounts, and usage amounts of resources in the storage devices 1 and store collected information in the operation information 125.

The management handling execution units 123 are programs that receive and execute the management handling of the storage devices 1 transmitted from the management server 2. The management handling execution units 123 update the information of the configuration information 126 or the ownership management information 127 according to the content of the management handling.

The cache management units 124 are programs that manage caches 16 in the storage devices 1*a*, 1*b*, and 1*c*. The cache management units 124 update information of the cache management information 128 according to the management handling or the I/O contents.

The operation information 125 is tables that store the operation information of the storage devices 1*a*, 1*b*, and 1*c*. Details of the operation information 125 are described below with reference to FIG. 6 that illustrates specific examples.

The configuration information 126 is tables that store configuration information of the storage devices 1*a*, 1*b*, and 1*c*. Details of the configuration information 126 are described below with reference to FIG. 7 that illustrates specific examples.

The ownership management information 127 is tables that store management information of ownership which is the right of control of the volume for each CPU 11 of the storage devices 1*a*, 1*b*, and 1*c*. Details of the ownership management information 127 are described below with reference to FIG. 8 that illustrates specific examples.

The cache management information 128 is tables that store pointers (cache management pointers) of the caches 16 in the storage devices 1*a*, 1*b*, and 1*c* and the states thereof. Details of the cache management information 128 are described below with reference to FIG. 9 that illustrates specific examples.

Figure 5:
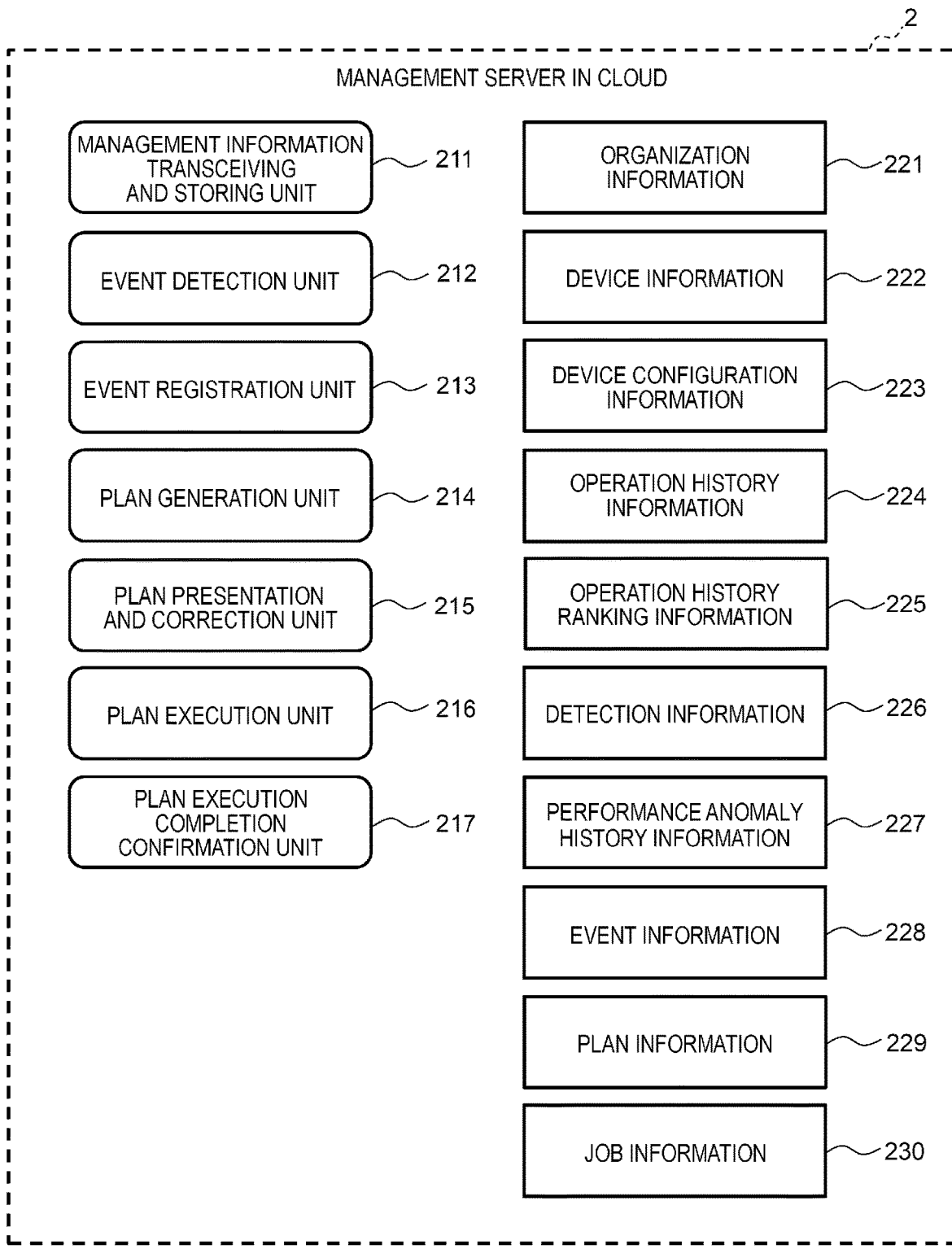
FIG. 5 is a diagram illustrating programs and information stored in a management server 2 in the cloud.

FIG. 5 is a diagram illustrating programs and information stored in the management server 2 in the cloud. As illustrated in FIG. 5, the management server 2 in the cloud stores the management information transceiving and storing unit 211, the event detection unit 212, an event registration unit 213, the plan generation unit 214, a plan presentation and correction unit 215, the plan execution unit 216, a plan execution completion confirmation unit 217, organization information 221, device information 222, the device configuration information 223, the operation history information 224, the operation history ranking information 225, detection information 226, performance anomaly history information 227, event information 228, the plan information 229, and job information 230.

The management information transceiving and storing units 211 are programs that communicate with the management information transceiving units 121 of the storage devices 1*a*, 1*b*, and 1*c*, receive information from the storage devices 1*a*, 1*b*, and 1*c*, transmit management handling from the management server 2 to the storage devices 1*a*, 1*b*, and 1*c*, and store the received information in the device information 222, the device configuration information 223, the operation history information 224, the operation history ranking information 225, or the performance anomaly history information 227.

The event detection units 212 are programs that check whether detection conditions are satisfied by using the information of the operation history information 224, the operation history ranking information 225, and the performance anomaly history information 227, and detect cases where detection conditions are satisfied as events.

The event registration units 213 are programs loaded when events are detected by the event detection units 212, and the events detected by the event detection units 212 are programs stored in the event information 228.

The plan generation units 214 are programs that generate plans for resolving events registered on the event information 228 by the event registration units 213. The plan generation units 214 store the generated plans in the plan information 229 and the job information 230.

The plan presentation and correction units 215 are programs that present the plan information generated by the plan generation units 214 to the user (administrator) to obtain approval. The plan presentation and correction units 215 are programs that receive time when the execution of the plans is desired (desired execution time) or time when the execution of the plans is not permitted (prohibited execution time) from the user (administrator) to correct the plans. The interface presented by the plan presentation and correction unit 215 to the user (administrator) may be any I/F such as GUI, Command Line Interface (CLI), or Usage Programming Interface (API).

The plan execution units 216 are programs generated by the plan generation units 214 or programs executed by the plans corrected by the plan presentation and correction units 215. The plan execution units 216 transmit the information of the plan information 229 and the job information 230 to the management information transceiving and storing units 211 to transmit the information of the storage handling for executing the plans to the storage devices 1*a*, 1*b*, and 1*c*.

After the plan execution by the plan execution units 216, the plan execution completion confirmation units 217 are programs that collect operation information in the storage devices 1 (refer to the operation history information 224, in practice) to confirm whether the events are resolved. The plan execution completion confirmation units 217 update the event information 228 if it is confirmed that the events are resolved or a certain period of time elapses from the plan execution.

The organization information 221 is tables that store information of organizations using the data centers 3 and the storage devices 1a, 1b, and 1c in the data centers 3. Details of the organization information 221 are described below with reference to FIG. 10 that illustrates specific examples.

The device information 222 is tables that store information indicating identifiers, names, and states of the storage devices 1a, 1b, and 1c of the management targets of each organization for each organization stored in the organization information 221. Details of the device information 222 are described below with reference to FIG. 11 that illustrates specific examples.

The device configuration information 223 are tables that store configuration information of each of the storage devices 1a, 1b, and 1c stored as the management targets in the device information 222. Details of the device configuration information 223 are described below with reference to FIG. 12 that illustrates specific examples.

The operation history information 224 is tables that store the history information of the time sequence of the operation information collected from the storage devices 1a, 1b, and 1c stored as the management targets in the device information 222. Details of the operation history information 224 are described below with reference to FIG. 13 that illustrates specific examples.

The operation history ranking information 225 is tables that store ranking with respect to resources with a high load and the load amounts thereof from the history information of the time sequence of the operation information collected from the storage devices 1a, 1b, and 1c of the management targets which are stored in the operation history information 224. Details of the operation history ranking information 225 are described below with reference to FIG. 14 that illustrates specific examples.

The detection information 226 is tables that store the information for detecting events from the operation information of the storage devices 1a, 1b, and 1c of the management targets and store the information relating to the configuration conditions of the detection conditions for detecting the events. Details of the detection information 226 are described below with reference to FIG. 15 that illustrates specific examples.

The performance anomaly history information 227 is tables that store resource identifiers thereof, threshold values, time, usage rates, and the like if the operation information of the storage devices 1a, 1b, and 1c of the management targets exceed the criteria indicating the performance anomaly. Details of the performance anomaly history information 227 are described below with reference to FIG. 16 that illustrates specific examples.

The event information 228 is tables that store the information of the events if the detection conditions of the events are satisfied. Details of the event information 228 are described below with reference to FIG. 17 that illustrates specific examples.

The plan information 229 is tables that store the entire information relating to the plans for resolving the events registered on the event information 228 (for example, handling names, registration time, predicted processing time, and information relating to side effects accompanied by the plan execution) and information required by the plan execution (for example, the scheduled execution time or prohibited execution time). Details of the plan information 229 are described below with reference to FIG. 18 that illustrates specific examples.

The job information 230 is tables that store the contents of specific handling for the storage devices 1a, 1b, and 1c if the plans registered on the plan information 229 are executed. Details of the job information 230 are described below with reference to FIG. 19 that illustrates specific examples.

(1-3) Various Kinds of Data

FIG. 6 is a diagram illustrating an example of the operation information 125. As illustrated in FIG. 6, the operation information 125 manages resource types 12501 indicating the type information of the resources included in the storage devices 1, resource IDs 12502 indicating the identifiers of the resources, metric 12503 indicating names of the metric in the target resources, and values 12504 indicating the values of the metric.

Among these, the resource types 12501 at least store information of the CPUs 11, the volumes 18, and the caches 16 which is load information required for the calculation of the ownership change, but are not limited only to these resources.

The metric 12503 stores, as the metric relating to the CPUs 11, the information of various kinds of "BusyTime" to be the source information for calculating the usage rates of the CPUs 11 (indicating the time when the processor becomes a non-idle state) and "UsageRanking" indicating the ranking of the volumes 18 with high use rates of the CPUs 11. In the values 12504 of the metric "UsageRanking", not only the identifiers of the volumes 18 but also "BusyTime" for each volume is also set. The metric relating to the CPUs 11 is not required to be limited to the above examples, and other metric may be stored. The operation information may be managed for each core in one CPU 11. In this case, by using the average values of the operation information of each core as the one entire CPU 11 or the like, the values of the entire CPU 11 may be stored.

The metric 12503 may store, as the metric relating to the volumes 18, values such as "SequentialReadIoCount", "SequentialWriteIoCount", "RandomReadIoCount", "RandomWriteIoCount", "SequentialReadHitIoCount", and "RandomReadHitIoCount" which are Read/Write information of each sequential I/O or random I/O, "ReadAccumulatedResponseTime" and "WriteAccumulatedResponseTime" required for the calculation of the I/O response time, and "SequentialReadBlockCount", "SequentialWriteBlockCount", "RandomReadBlockCount", and "RandomWriteBlockCount" required for the calculation of the data transfer amount. The metric relating to the volumes 18 is not required to be limited to the above examples.

The metric 12503 may store "WritePendingRate" indicating the rate in which writing to the cache memory 16 is pending as the metric relating to the cache 16. The metric relating to the caches 16 is not required to be limited to the above examples.

According to the present embodiment, an example in which the raw data of the operation information (accumulated values) is stored in the storage devices 1, and the accumulated values are converted into the average values and then transmitted to the management server 2 in the cloud is provided. However, the present embodiment is not required to be limited to these and may have a configuration of calculating the average values in the storage devices 1 and transmitting the information thereof to the management server 2 in the cloud without change.

FIG. 7 is a diagram indicating an example of the configuration information 126. As illustrated in FIG. 7, the configuration information 126 manages device serial numbers 12601 indicating product serial numbers for identifying the storage devices 1, device models 12602 indicating the models (types) of the storage devices 1, resource types 12603 indicating the type information of the resources included in the storage devices 1, resource IDs 12604 indicating the identifiers of the resources, related resources 12605 indicating the relationship between resources, specifications 12606 indicating specifications of each resource (size, speed, and the like), and attributes 12607 indicating the attribute information of the resources in each of the storage devices 1.

Among these, the resource types 12603 stores information of the CPUs 11, the caches 16, port (the network I/Fs 14), the drives 13, the pools 17, and the volumes 18 included in each of the storage devices 1a, 1b, and 1c.

The related resources 12605 store physical and logical relationships between the drives 13 and the pools 17, relationships between logical resources of the pools 17 and the volumes 18, and the like.

The specifications 12606 store the numerical performance values (specifications) of physical or logical configurations.

For example, if the target resources are the volumes 18, the attributes 12607 can indicate that the compression function of the corresponding volume is effective, with attribute information referred to as "compression" and indicate that copy setting is set for the corresponding volume, with attribute information referred to as "copy". In the attribute information of the "copy", identifiers of other volumes in which a pair state of the corresponding volume is set may be described. In the attributes 12607, a plurality of kinds of attribute information may set for one resource.

Figure 8:
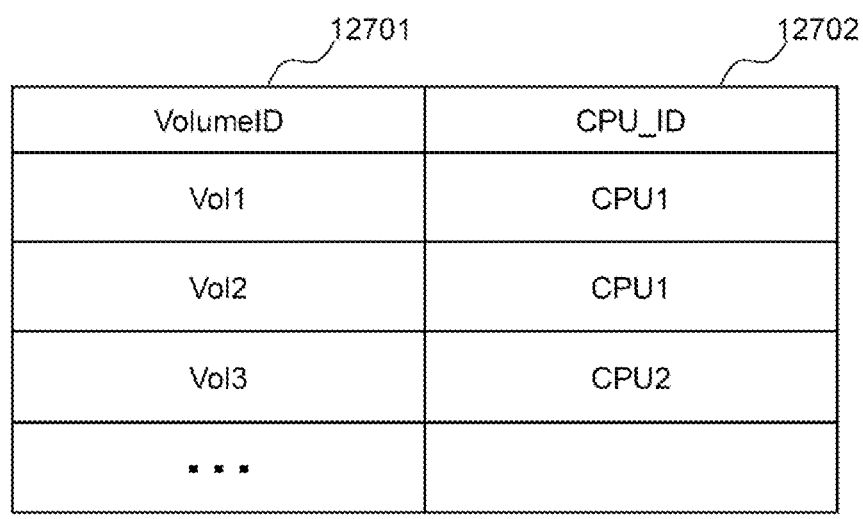
FIG. 8 is a diagram indicating an example of ownership management information 127.

FIG. 8 is a diagram indicating an example of the ownership management information 127. The ownership management information 127 stores the information relating to the ownership (right of control) included in the storage devices 1 indicating which volume 18 is controlled by a certain CPU 11 in the storage device 1 (which CPU 11 controls a certain volume 18). Specifically, as illustrated in FIG. 8, the ownership management information 127 stores volume IDs 12701 indicating the identifiers of the volumes 18 and CPU IDs 12702 indicating the identifiers of the CPUs 11 in the combination of the volumes 18 and the CPUs 11 included in the control relationship by the ownership.

FIG. 9 is a diagram indicating an example of the cache management information 128. As illustrated in FIG. 9, the cache management information 128 stores the information of CPU IDs 12801 indicating the identifiers of the CPUs 11, volume IDs 12802 indicating the identifiers of the volumes 18, cache management pointers 12803 which are pointers in caches indicating which areas of the volume 18 store the caches 16, and states 12804 indicating states of the cache management pointers.

As also disclosed in JP2016-510440A, in the management of the ownership, it is required to manage which area of the volume are stored in a certain area of the cache. Therefore, if the ownership of the CPU that manages the volume is changed from a certain CPU to another CPU, information of the management information (cache management pointer) in the CPU of the change destination is required to be copied.

In the states 12804 of the cache management information 128 illustrated in FIG. 9, the state during the copy is set as "migrating", and a normal state in which the migration is completed is set as "normal". If I/O is generated in the state of "migrating", the cache is not effective, and thus the I/O performance is deteriorated.

FIG. 10 is a diagram indicating an example of the organization information 221. If a plurality of items of storage are managed, a plurality of items of storage may be managed as one organization. Therefore, according to the present embodiment, the plurality of items of storage is managed in the unit referred to as an organization. Without giving meaning to tenants, department units, or simple aggregates, an ID is given to the group, the plurality of items of storage may be managed for each group. The organization information 221 stores the information relating to this organization, and specifically stores IDs 22101 indicating the identifiers of the organizations, organization codes 22102 indicating code names assigned to the organizations, types 22103 indicating organization types, and names 22104 indicating organization names, as illustrated in FIG. 10. Among these, the types 22103 can obtain values of a customer or a partner. The information stored by the organization information 221 is first set, for example, when the operation starts.

FIG. 11 is a diagram indicating an example of the device information 222. As illustrated in FIG. 11, the device information 222 stores organization IDs 22201 indicating the identifiers of the organizations that store or manage the storage devices 1, device serial numbers 22202 indicating product serial numbers of the storage devices 1, device models 22203 indicating models (types) of the storage devices 1, names 22204 indicating names of the storage devices 1, and states 2205 indicating connection states of the cloud of the storage devices 1.

For example, the device information 222 periodically updates information by the communication of the management information transceiving and storing unit 211 with the storage devices 1 or updates information by the event driven communication. The organization IDs 22201 correspond to the IDs 22101 of the organization information 221 illustrated in FIG. 10. The device serial numbers 22202 and the device models 22203 correspond to the device serial numbers 12601 and the device models 12602 of the configuration information 126 illustrated in FIG. 7, respectively.

FIG. 12 is a diagram indicating an example of the device configuration information 223. As illustrated in FIG. 12, the device configuration information 223 stores organization IDs 22301 indicating the identifiers of the organizations that store or manage the storage devices 1, device serial numbers 22302 indicating product serial numbers of the storage devices 1, device models 22303 indicating models (types) of the storage devices 1, resource types 22304 indicating type information of resources included in the storage devices 1, resource IDs 22305 indicating the identifiers of the resources, related resources 22306 indicating relationships between resources, specifications 22307 indicating specifications (size, speed, and the like) of the resources, and attributes 22308 indicating attribute information of the resources in the storage devices 1.

For example, the device configuration information 223 periodically updates information by the communication of the management information transceiving and storing unit 211 with the storage devices 1 or updates the information by the event driven communication. The organization IDs 22301 correspond to the IDs 22101 of the organization information 221 illustrated in FIG. 10. The device serial numbers 22302, the device models 22303, the resource types 22304, the resource IDs 22305, the specifications 22307, and the attributes 22308 correspond to the device serial numbers 12601, the device models 12602, the resource types 12603, the resource IDs 12604, the specifications 12606, and the attributes 12607 of the configuration information 126 illustrated in FIG. 7, respectively. The related resources 22306 of the device configuration information 223 store related information of the volumes 18 and the CPUs 11 presented in the ownership management information 127 (refer to FIG. 8) in addition to the information described in the related resources 12605 of the configuration information 126 (refer to FIG. 7). For example, in FIG. 12, IDs of the CPUs 11 are described in the related resources 22306 as the related resources of the volumes 18, but IDs of the volumes 18 may be set as the related resources of the CPUs 11. In this case, IDs of the plurality of volumes 18 may be set.

FIG. 13 is a diagram indicating an example of the operation history information 224. The operation history information 224 is information calculated based on the operation information 125 stored in the storage device 1, and is periodically updated by the communication performed between the management information transceiving unit 121 of the storage device 1 and the management information transceiving and storing unit 211 of the management server in the cloud. Specifically, with respect to the information recorded in the operation history information 224, after the management information transceiving unit 121 calculates values to be registered on the operation history information 224 based on the information of the operation information 125, the management information transceiving and storing unit 211 receives these values and updates the information. As another example, the management information transceiving and storing unit 211 may receive the information of the operation information 125 from the management information transceiving unit 121, calculate the value together with the information of the operation information 125 after the reception, and update the operation history information 224.

As illustrated in FIG. 13, the operation history information 224 manages organization IDs 22401 indicating the identifiers of the organizations that store or manage the storage devices 1, device serial numbers 22402 indicating product serial numbers of the storage devices 1, device models 22403 indicating models (types) of the storage devices 1, resource types 22404 indicating type information of the resources included in the storage devices 1, resource IDs 22405 indicating the identifiers of the resources, time 22406 indicating the time when the information of the record is calculated (or received), metric 22407 indicating names of the metric in the target resource, and values 22408 indicating the values of the metric.

Among these, the organization IDs 22401 correspond to the IDs 22101 of the organization information 221 illustrated in FIG. 10. The device serial numbers 22202 and the device models 22203 correspond to the device serial numbers 12601 and the device models 12602 of the configuration information 126 illustrated in FIG. 7, respectively. The resource types 22404 and the resource IDs 22405 correspond to the resource types 12501 and the resource IDs 12502 of the operation information 125 illustrated in FIG. 6, respectively.

According to the present embodiment, as described in the operation information 125 of FIG. 6, an example in which the storage devices 1 store raw data (accumulated values) of the operation information, and the management server 2 in the cloud stores values with raw data (accumulated values) as average values in the operation history information 224 is provided. In this case, the time 22406 indicates the time when the average is calculated, and the values 22408 indicate average values of the metric. Any values may be obtained as the time interval.

The metric 22407 stores information of various kinds of "BusyTime" indicating usage rates of the CPUs 11 as the metric relating to the CPUs 11 or "UsageRanking" indicating ranking of the volumes 18 of the CPUs 11 with high use rates. For example, the usage rate can be calculated by dividing the difference of "BusyTime" at two time points with the time of the difference at two time points of the acquired time. The metric relating to the CPUs 11 stored in the metric 22407 is not required to be limited to the above examples, and other metric may be stored.

The metric 22407 may stores values such as "SequentialReadIOPS", "SequentialWriteIOPS", "RandomReadIOPS", "RandomWriteIOPS", "SequentialReadHitIOPS", and "RandomReadHitIOPS" which are respectively Read/Write information of sequential I/O or random I/O as metric relating to the volumes 18, "ReadResponseTime" and "WriteResponsetTime" which are I/O response time, and "SequentialReadTransferRate", "SequentialWriteTransferRate", "RandomReadTransferRate", and "RandomWriteTransferRate" which are data transfer amounts. For example, various kinds of "IOPS" can be calculated by dividing the difference of various kinds of "IoCount" (refer to FIG. 6) at two time points with the time of the difference of the acquired time at two time points. Various kinds of "ResponseTime" can be calculated by dividing the difference of each "AcccmulatedResponseTime" at two time points (refer to FIG. 6) with the time of the difference of the acquired time at two time points. Each "TransferRate" can calculate by dividing the difference of various kinds of "BlockCount" (refer to FIG. 6) at two time points with the time of the difference of the acquired time at two time points. The metric relating to the volumes 18 stored in the metric 22407 is not required to be limited to the examples.

The metric 22407 may store "WritePendingRate" indicating the rate in which writing to the cache memory 16 is pending as the metric relating to the caches 16, but the metric relating to the caches 16 is not required to be limited to the above examples.

FIG. 14 is a diagram indicating an example of the operation history ranking information 225. The operation history ranking information 225 is generated as a value of the metric "UsageRanking" in the operation history information 224 illustrated in FIG. 13. As illustrated in FIG. 14, the operation history ranking information 225 stores organization IDs 22501 indicating the identifiers of the organizations that store or manage the storage devices 1, device serial numbers 22502 indicating product serial numbers of the storage devices 1, device models 22503 indicating models (types) of the storage devices 1, CPU IDs 22504 indicating the identifiers of the CPUs 11, a time 22505, ranks 22506 indicating ranking, volume IDs 22507 indicating the identifiers of the volumes 18, and Busy-Rate-In-Percent 22508 indicating CPU usage rates for each of the volumes 18.

FIG. 15 is a diagram indicating an example of the detection information 226. The detection information 226 stores information relating to the configuration condition of the detection condition for detecting events and stores IDs 22601 indicating the identifiers of the detection information, organization IDs 22602 indicating the identifiers of the organizations that store or manage the storage devices 1, device serial numbers 22603 indicating product serial numbers of the storage devices 1, device models 22604 indicating models (types) of the storage devices 1, threshold values 22605 indicating threshold values used for the determination of the performance anomaly, minimum detection intervals 22606 indicating minimum detection interval (MinimumDetectionInterval) set as the time interval for detecting the excess of the threshold value, detection periods 22607 indicating detection periods (DetectionPeriod) for detecting the excess of the threshold value, and detection counts 22608 indicating detection counts (DetectionCount) which is the number of the detection of the excess of the threshold value during the detection period, as illustrated in FIG. 15.

Among these, the threshold values 22605 may be a fixed value or may be a non-fixed value. In a case of the fixed values, values defined by the system in advance may be used. In a case of the non-fixed values, appropriate values may be set according to the operation of the user or may be set before the operation and changed during the operation. Also, appropriate values may be determined and set not only by the user operation but also by learning.

Subsequently, examples of the minimum detection intervals 22606, the detection periods 22607, and the detection counts 22608 are described. In the present example, the detection periods 22607 and the detection counts 22608 are used for the anomaly generation condition.

As a basic idea, with respect to problems such as performance imbalance in the rights of control of the CPUs 11 and the volumes 18, it is required to look at long-term trends rather than looking at momentary deviations. In order to look at the long-term trends, short-term performance fluctuations become noise. Therefore, it is preferable to first remove noise and then determine the long-term trends. The minimum detection interval is used as an example of noise removal, and the detection period and the detection count are used as an example of long-term trend determination.

The minimum detection intervals 22606 are time intervals (resolution) for detecting the excess of the threshold value. For example, when the operation information is transmitted from the storage device 1 to the management server 2 in the cloud at the interval of five minutes, if the excess of the threshold value is detected, the performance anomaly history registration or confirmation of the history of the excess of the threshold value generated in the other CPUs is performed. However, when the process is performed at a short period of time interval, the processing load of the management server 2 increases. In order to avoid this, the minimum detection interval (for example, one hour) is provided to check whether imbalance that the deviation is larger than the average value is generated even after the minimum detection interval in a certain CPU, so that the processing load on the management server 2 side can be decreased. That is, the minimum detection interval can be used for down-sampling the detection of the imbalance in the time direction.

Here, when only the minimum detection interval is used, the following defects are assumed. Even if the performance information has a trend, the metric has large fluctuations, imbalance may not be generated at a certain time point (a certain time point at the interval of five minutes), occasionally. In such a case, it may be determined that there is no anomaly at the time (until the minimum detection interval) at the timing when the imbalance does not occur. In the present example, in order to compensate for the above defects, two determination criteria by the detection periods 22607 and the detection counts 22608 are provided.

The detection period 22607 is a period indicating to which time in the past, the period from the current time is set as the detection target. The detection count 22608 is a value indicating the number of times that the threshold value of the criteria exceeds (imbalance is generated) during the detection period. For example, a case where the detection period is five days, and the detection count is 30 times is considered. During the detection period (five days), performance anomaly is detected by the checking per minimum detection interval (one time), and if the number of times exceeds the detection count (30 times), it is normally determined that performance anomaly (imbalance) is generated. In this manner, by providing the minimum detection interval, down-sampling is performed in the time direction, the processing load on the management server 2 side can be reduced. By providing the detection period and the detection count, as the long-term trend, not only when the performance imbalance degree is gradually increase but also when a case where the performance metric itself fluctuates in increase and decrease but the imbalance is repeated as a long-term trend (one hour*30 times/(24 hours*five days)=25%, that is, a case where the imbalance is generated during 25% of the detection period), events can be detected as the performance anomaly (imbalance).

In the example of FIG. 15, the threshold value, the minimum detection interval, the detection period, and the detection count are set for each storage device 1, but common values may be set in the system. These values may be fixed values or may be non-fixed values. In a case of the fixed values, values defined by the system in advance may be used. In a case of the non-fixed values, appropriate values may be set according to the operation of the user or may be set before the operation and changed during the operation. Also, appropriate values may be determined and set not only by the user operation but also by learning.

As a method of removing a noise, not only the down-sampling method using the minimum detection interval that can be easily processed but also a method such as a low-pass filter or window aggregation (tumbling window or sliding window) may be used. Further, for determining a long-term trend, for example, a fast Fourier transform may be used to confirm the periodicity, or regression calculation may be performed to make a prediction.

FIG. 16 is a diagram indicating an example of the performance anomaly history information 227. The performance anomaly history information 227 is updated by the event registration unit 213. As illustrated in FIG. 16, the performance anomaly history information 227 stores IDs 22701 indicating the identifiers of the performance anomaly, organization IDs 22702 indicating the identifiers of the organizations that store or manage the storage devices 1, device serial numbers 22703 indicating the product serial numbers of the storage devices 1, device models 22704 indicating the models (types) of the storage devices 1, CPU IDs 22705 indicating the identifiers of the CPUs 11, threshold values 22706 indicating the threshold values used for the determination of the performance anomaly, anomaly generation time 22707 indicating the time when the performance anomaly is generated, and usage rates 22708 indicating the usage rates of the CPUs 11 at the anomaly generation time. The threshold values 22706 may be fixed values or may be non-fixed values. In the case of the fixed values, values defined by the system in advance may be used. In a case of the non-fixed values, appropriate values may be set according to the operation of the user or may be set before the operation and changed during the operation. Also, appropriate values may be determined and set not only by the user operation but also by learning.

FIG. 17 is a diagram indicating an example of the event information 228. The event information 228 is updated by the event registration unit 213. As illustrated in FIG. 17, the event information 228 stores IDs 22801 indicating the identifiers of the events, organization IDs 22802 indicating the identifiers of the organizations that store or manage the storage devices 1, device serial numbers 22803 indicating the product serial numbers of the storage devices 1, device models 22804 indicating the models (types) of the storage devices 1, generation time 22805 indicating the generation time of the events, update time 22806 indicating the time when dealing with the events is performed and the events are resolved, and resolution completion 22807 indicating status whether the events are resolved. In the event information 228, if an event is generated, dealing with the event is performed, and the event is resolved, the update time 22806 is updated at the resolution time, and the resolution completion 22807 is set as "Yes".

FIG. 18 is a diagram indicating an example of the plan information 229. The plan information 229 stores information relating to the plans for resolving the events described in the event information 228 and is updated by the plan generation unit 214 or the plan presentation and correction unit 215. Specifically, as illustrated in FIG. 18, the plan information 229 stores IDs 22901 indicating the identifiers of the plans, event IDs 22902 indicating the identifiers of the events (event IDs), device serial numbers 22903 indicating the product serial numbers of the storage devices 1, device models 22904 indicating the models (types) of the storage devices 1, states 22905 indicating the states of the plans, plan registration time 22906 indicating the time when the plans are registered on the plan information 229, plan change time 22907 indicating the time when the plans are changed, predicted processing time 22908 indicating processing time predicted at the time of the execution of the plans, I/O influence prediction 22909 indicating predicted values of the influence on I/O (I/O influence loads) if the plans are executed (during the execution), CPU influence prediction 22910 indicating predicted values of the influences on the CPUs 11 (CPU load increase amount) if the plans are executed (during the execution), user-specified conditions 22911 indicating specified conditions from the user with respect to the execution time of the plans, scheduled execution time 22912 indicating the scheduled execution time of the plans, and prohibited execution time 22913 of the plans indicating the time specified by the user when the execution of the plans are prohibited.

Among these, the event IDs 22902 correspond to the IDs 22801 of the event information 228 illustrated in FIG. 17. Values that can be set for the states 22905 are "Scheduled" in which the plans are registered and are not executed, "Executing" in which the plans are executed, and the like. Also, the values are not limited thereto, and other values may be set.

In the predicted processing time 22908, an estimated value of the time required for the execution of the job processing described in the job information 230 described below is set.

If the I/O performance is deteriorated when the plans are executed, the I/O influence prediction 22909 indicates the deterioration degree thereof. In the I/O influence prediction 22909 of FIG. 18, rates are described, but are not limited thereto, and may be absolute values of the response time (ResponseTime), rates of other metric, or absolute values.

With respect to the CPU influence prediction 22910, since loads are applied to the CPUs 11 by the plan execution process for executing the plans, information for predicting the influences thereof is set. In the CPU influence prediction 22910 of FIG. 18, rates changed from the current state are described, but, for example, deteriorated values of the CPU usage rates (BusyRate) may be set.

If the specified conditions (the desired execution time or the prohibited execution time) are set by the user when the plans are presented to the user, the user-specified conditions 22911 indicates that the specified conditions are set, and is described, for example, as "desired time" when the desired execution time is set and described as "prohibited time" when the prohibited execution time is set. In the scheduled execution time 22912, the scheduled execution time of the plans is described, but if the desired execution time is set by the user, the time is set. Meanwhile, if the desired execution time is not set by the user, suggested execution time of the plans which is determined by the system is set. If the prohibited execution time is set by the user, the value is set for the prohibited execution time 22913.

FIG. 19 is a diagram indicating an example of the job information 230. The job information 230 stores information indicating content of specific processes on the specific storage device 1 for the execution of the plans and is updated by the plan generation unit 214. According to the present embodiment, a plurality of jobs may correspond to one plan. As illustrated in FIG. 19, the job information 230 stores IDs 23001 indicating the identifiers of the job, plan IDs 23002 indicating the identifiers of the plans, device serial numbers 23003 indicating the product serial numbers of the storage devices 1, device models 23004 indicating models (types) of the storage devices 1, handling names 23005 indicating the handling executed for the jobs, change source CPUs 23006 indicating ownership change source CPUs, change target volumes 23007 indicating volume of change targets which are the volumes 18 of which the ownership is changed, and change destination CPUs 23008 indicating ownership change destination CPUs. Among these, the plan IDs 23002 correspond to the IDs 22901 of the plan information 229 illustrated in FIG. 18.

(1-4) Process

The processes executed in the computer system 100 according to the present embodiment are described.

The processing flows according to the present embodiment are mainly divided into four flows of a process of collecting usage information such as configuration information or operation information from the storage devices 1 to the management server 2 in the cloud (information collection process), a process of detecting the events from the collected information (detection process), a process of generating plans for dealing with the detected events (plan generation process), and a process of executing plans (plan execution process). In the computer system 100 according to the present embodiment, two periodic processes other than the four processes are executed. One is a process in which the operation information collection and storage unit 122 of the storage device 1 periodically collects the operation information (I/O, load of CPU, or the like) of the storage device 1, and stores in the operation information 125. The other one is a process in which the cache management unit 124 of the storage device 1 updates the cache management information 128 as also disclosed in JP2016-510440A. In this process, the relationship between the CPU IDs 12801 and the volume IDs 12802 in the cache management information 128 are periodically checked in the background, and the cache management pointers 12803 are periodically updated (periodic scanning of the dirty areas of the caches are performed). These processes are not the characteristics of the present patent but are well-known in the art, and thus are not illustrated, and the four processing flows exemplified first are specifically described with reference to the drawings.

Figure 20:
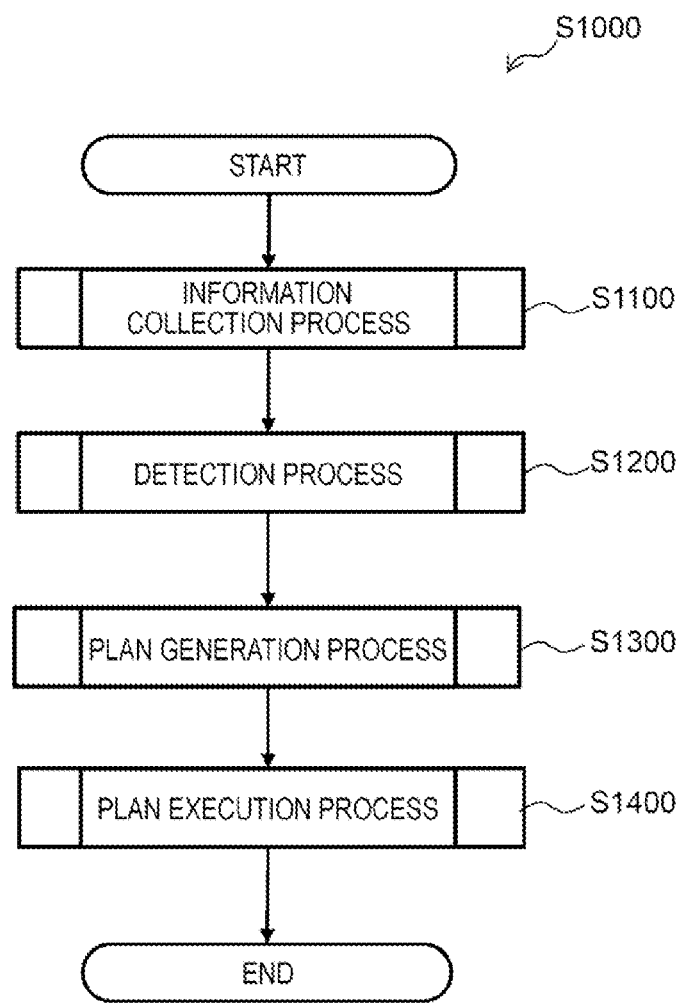
FIG. 20 is a flowchart illustrating a processing procedure example of overall processing according to the first embodiment.

FIG. 20 is a flowchart illustrating a processing procedure example of overall processing according to the first embodiment.

According to the overall process 51000 illustrated in FIG. 20, first, the information collection process for transmitting the information from the storage device 1 to the management server 2 in the cloud is executed (Step S1100). In the present example, the process of Step S1100 is periodically executed, but the execution timing of the process of Step S1100 according to the present embodiment is not limited to this, and for example, the execution may be performed upon receiving the push notification from the storage device 1. Step S1100 corresponds to Step S1 illustrated in FIG. 1.

Subsequently, after Step S1100 is executed, and various kinds of information are transmitted and stored in the management server 2 in the cloud, the detection process for detecting the events is executed (Step S1200). Step S1200 corresponds to Step S2 illustrated in FIG. 1.

Subsequently, if the event executed in Step S1200 is registered on the event information 228, the plan generation process for generating the plan for resolving the event is executed (Step S1300). Step S1300 corresponds to Step S3 illustrated in FIG. 1. A shift from Step S1200 to Step S1300 may be executed by an event driven manner, or may be executed when the generation of the event is once notified to the user (administrator) with GUI or the like, and instruction corresponding to the event is received from the user (administrator).

Then, after the plan is generated in Step S1300, the plan execution process for executing the plan is executed (Step S1400). Step S1400 corresponds to Step S4 illustrated in FIG. 1. The shift from Step S1300 to Step S1400 may be executed in an event driven manner, may be executed when there is an execution instruction of the plan from the user (administrator), or may be executed when the presence or absence of the plan is periodically checked in the system and the presence of the plan is confirmed.

Hereinafter, each process of Steps S1100 to S1400 is specifically described.

(1-4-1) Information Collection Process

Figure 21:
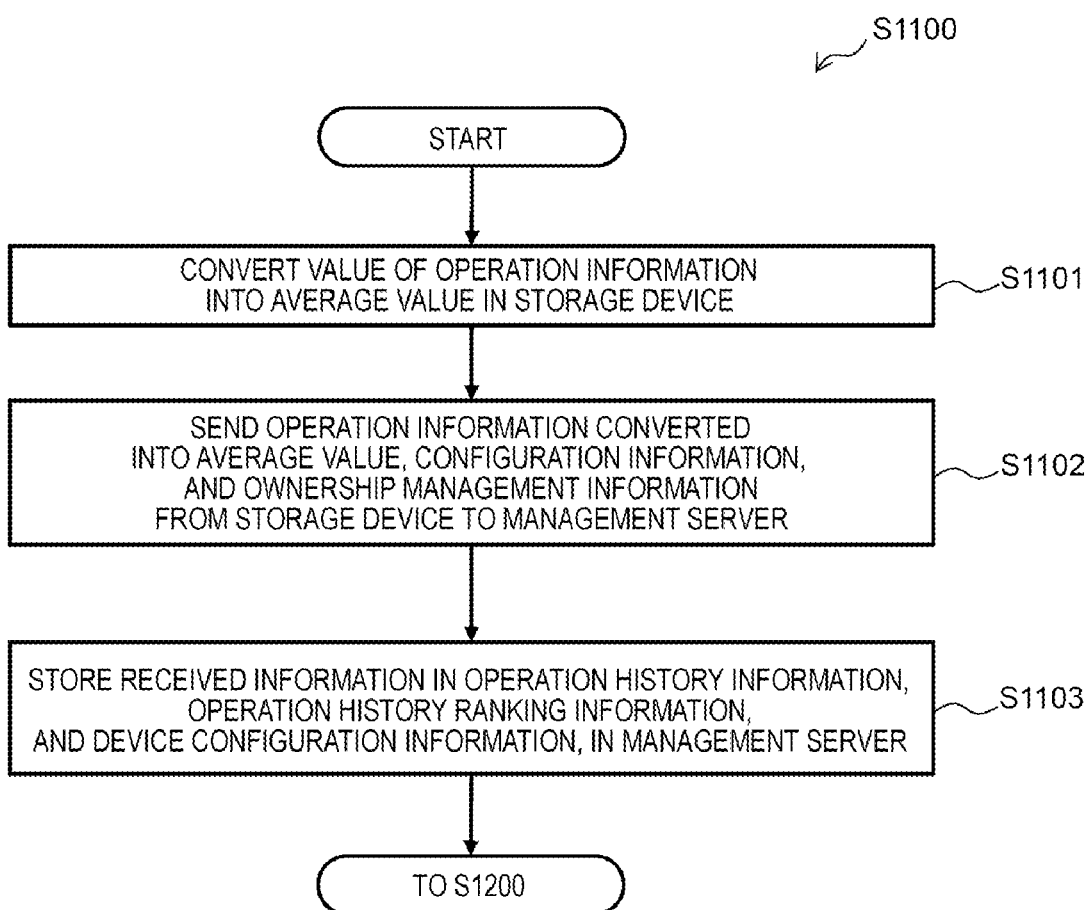
FIG. 21 is a flowchart illustrating a processing procedure example of an information collection process.

FIG. 21 is a flowchart illustrating a processing procedure example of the information collection process. The flowchart illustrated in FIG. 21 is to describe a specific processing procedure example of the information collection process of Step S1100 illustrated in FIG. 20.

According to FIG. 21, the management information transceiving unit 121 of the storage device 1 first converts the values of the operation information stored in the operation information 125 into the average values (Step S1101). As the method of calculating the average value, for example, the method described in the operation history information 224 of FIG. 13 is used.

Subsequently, the management information transceiving unit 121 sends operation information converted into the average values in Step S1101, the configuration information 126, and the ownership management information 127 to the management information transceiving and storing unit 211 of the management server 2 in the cloud (Step S1102).

Subsequently, the management information transceiving and storing unit 211 of the management server 2 appropriately stores the information received in Step S1102 to the device configuration information 223, the operation history information 224, and the operation history ranking information 225 (Step S1103). As described in the operation history ranking information 225 of FIG. 14, the operation history ranking information 225 is generated from the values of the metric "UsageRanking" in the operation history information 224.

If the process of Step S1103 is completed, the information collection process ends and shifts to the detection process of Step S1200.

(1-4-2) Detection Process

Figure 22:
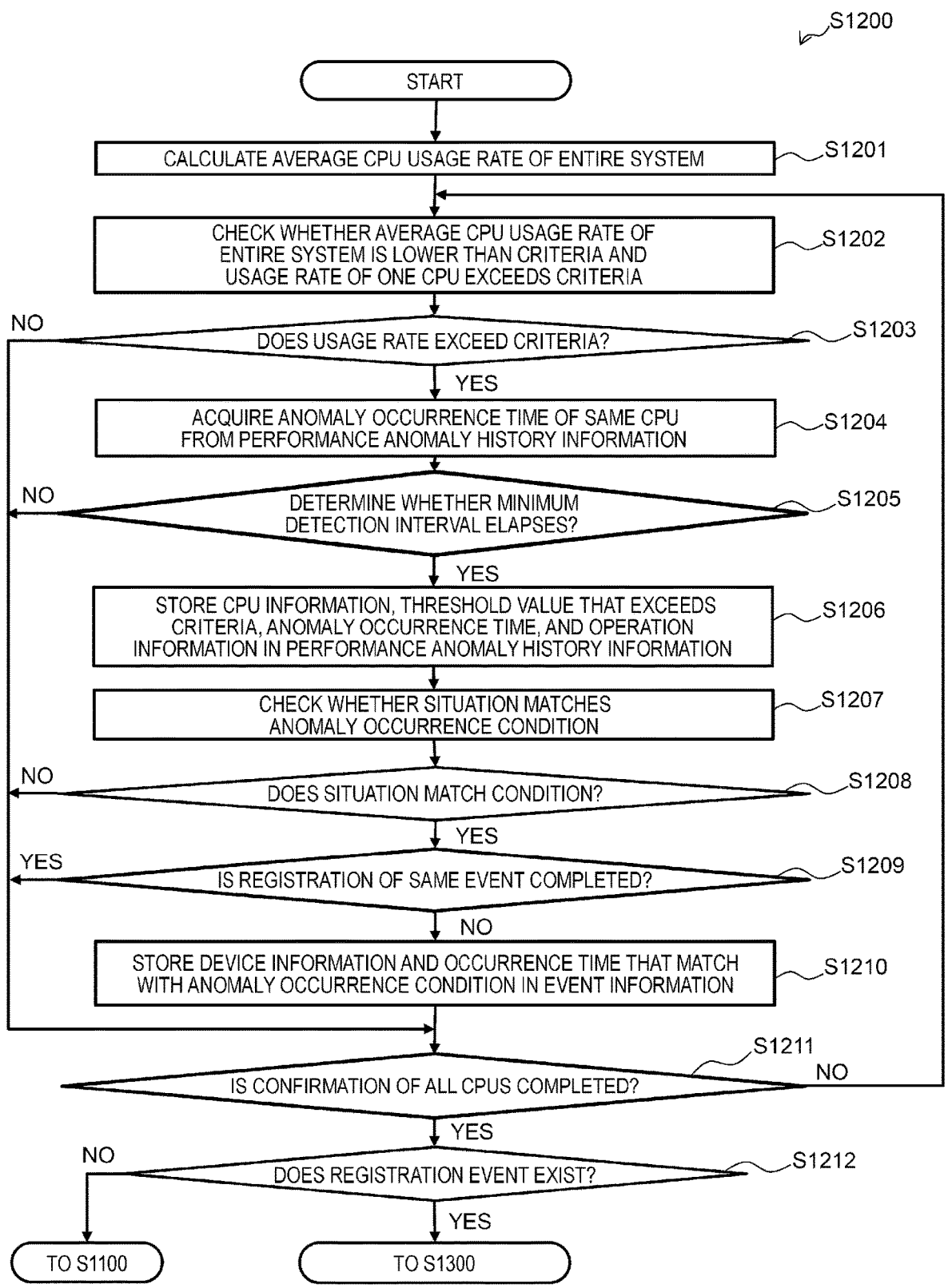
FIG. 22 is a flowchart illustrating a processing procedure example of a detection process.

FIG. 22 is a flowchart illustrating a processing procedure example of the detection process. The flowchart illustrated in FIG. 22 is to describe a specific processing procedure example of the detection process of Step S1200 illustrated in FIG. 20.

According to FIG. 22, the event detection unit 212 first refers to the operation history information 224 and calculates the average CPU usage rate of the entire system (the entire CPUs 11 stored in one storage device 1) at the current time (Step S1201).

Subsequently, the event detection unit 212 checks whether the average CPU usage rate of the entire system is lower than the criteria, and the usage rate of one CPU 11 is more than the criteria (Step S1202). Here, as the criteria value, the threshold values 22605 set in the detection information 226 are used.

Subsequently, the event detection unit 212 confirms check results of Step S1202 (Step S1203). If an affirmative result is obtained in Step S1203, that is, the average CPU usage rates of the entire system are lower than the criteria, and the usage rate of one CPU 11 exceeds the criteria (YES in Step S1203), the process proceeds to Step S1204. Meanwhile, if a negative result is obtained in Step S1203, that is, if the average CPU usage rates of the entire system are higher than the criteria, or if the average CPU usage rates of the entire system is lower than the criteria, but the usage rate of none CPU 11 exceeds the criteria (NO of Step S1203), the process proceeds to Step S1211.

In Step S1204, with respect to one CPU 11 that exceeds the criteria in Step S1203, the event detection unit 212 acquires a value of the anomaly generation time 22707 of the same CPU from the performance anomaly history information 227.

Subsequently, with respect to the same CPU 11 handled in Step S1204, the event detection unit 212 determines whether the time of the minimum detection intervals 22606 of the detection information 226 elapses (Step S1205). If an affirmative result is obtained in Step S1205 (YES in Step S1205), the process proceeds to Step S1206, and if a negative result is obtained in Step S1205 (NO in Step S1205), the process proceeds to Step S1211.

In Step S1206, the event registration unit 213 generates a new record in the performance anomaly history information 227 and registers each item of information of the generated record. Specifically, for example, the event registration unit 213 registers the identifier of the one CPU 11 handled in Step S1204 on the CPU ID 22705, the threshold value confirmed to exceed the criteria in Step S1203 on the threshold value 22706, the current time on the anomaly generation time 22707, and the usage rate of the corresponding CPU 11 at the current time point on the usage rate 22708.

Subsequently, the event registration unit 213 refers to the detection information 226 and checks whether the circumstance satisfies the anomaly generation condition (configured with the detection period 22607 and the detection count 22608 in the present example) for a certain period (Step S1207).

Then, the event registration unit 213 confirms the check result of Step S1207 (Step S1208). If an affirmative result is obtained in Step S1208, that is, the circumstance satisfies the anomaly generation condition (YES in Step S1208), the process proceeds to Step S1209. If a negative result is obtained in Step S1208, that is, the circumstance does not satisfy the anomaly generation condition (NO in Step S1208), the process proceeds to Step S1211.

According to the processes of Steps S1205 to S1208, down-sampling can be performed on the detection of the imbalance in the time direction by using the minimum detection interval.

In Step S1209, the event registration unit 213 confirms the event information 228 to determine whether the registration of an event with the same performance anomaly which is newly registered on the performance anomaly history information 227 in Step S1206 (the same event) is completed in a non-resolved state. Specifically, the event registration unit 213 confirms whether the same event in which the resolution completion 22807 is set as "No" is present in the event information 228. If an affirmative result is obtained in Step S1209, that is, the registration of the non-resolved same event is completed (YES in Step S1209), the process proceeds to Step S1211. If a negative result is obtained in Step S1209, that is, the registration of the non-resolved same event is not completed (NO in Step S1209), the process proceeds to Step S1210.

In Step S1210, the event registration unit 213 generates a new record in the event information 228, and registers information relating to the event (the device information or the generation time) determined that anomaly generation conditions are satisfied in Step S1208 on the record. Thereafter, the process proceeds to Step S1211.

In Step S1211, with respect to all of the CPUs 11 of all of the storage devices 1, the processes subsequent to Step S1202 are performed to check whether the confirmation such as the determination of the anomaly generation is performed. If the CPU 11 yet to be confirmed in Step S1211 is present (NO in Step S1211), the process returns to Step S1202 (may be Step S1203), and processes subsequent to Step S1202 (or Step S1203) are performed on the CPU 11 yet to be confirmed. Meanwhile, if the confirmation of all the CPUs 11 is completed in Step S1211 (YES in Step S1211), the process proceeds to Step S1212.

Then, in Step S1212, for example, the event registration unit 213 confirms the presence or absence of the event newly registered on the event information 228 by the processes up to this point in the detection process at this time. If a newly registered event is present in Step S1212 (YES in Step S1212), the detection process ends, and the process shifts to the plan generation process of Step S1300. Meanwhile, if a newly registered event is not present in Step S1212 (NO in Step S1212), the detection process ends, and the process shifts to the information collection process of Step S1100.

(1-4-3) Plan Generation Process

Figure 23:
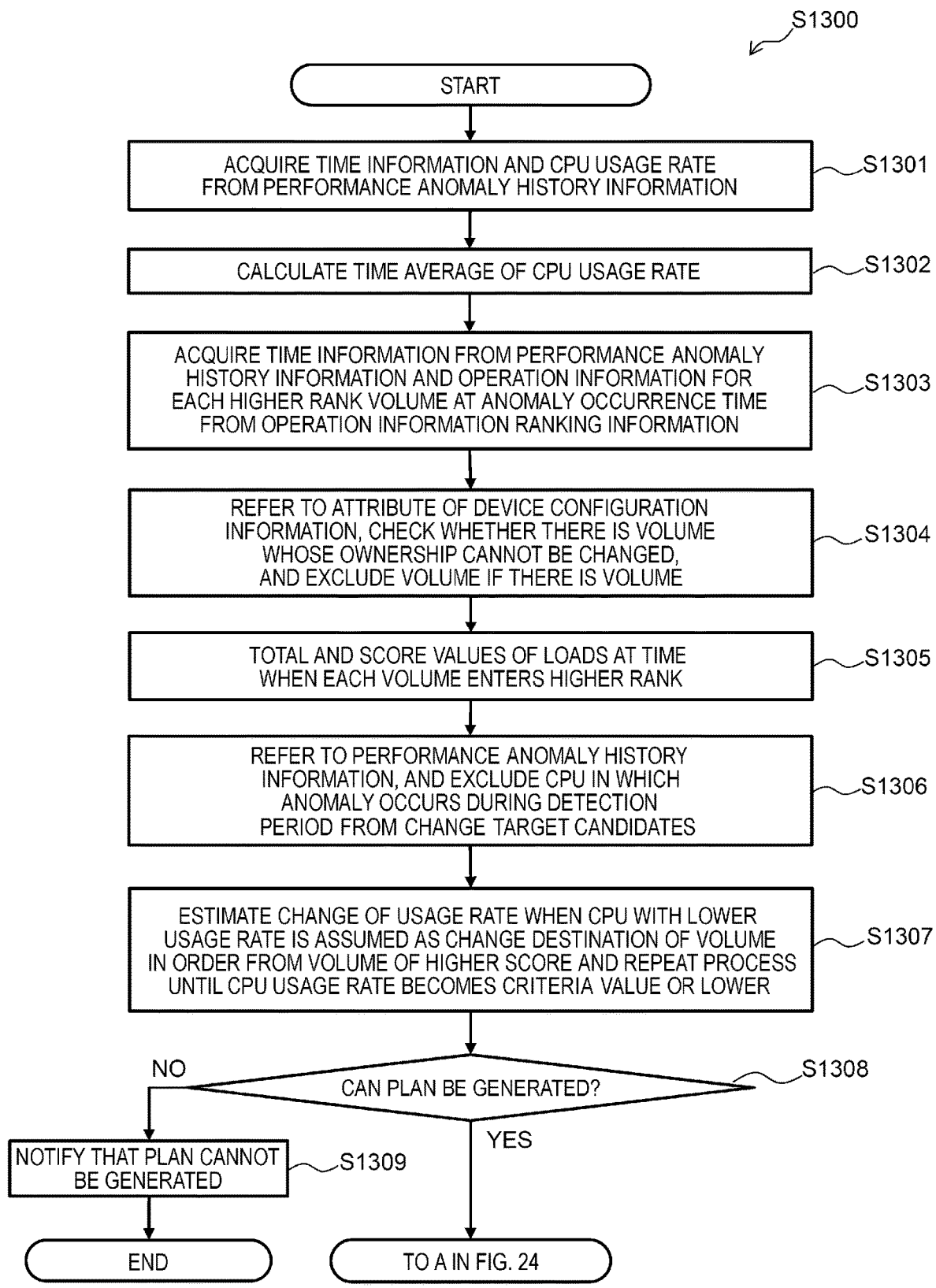
FIG. 23 is a flowchart illustrating a (first) processing procedure example of a plan generation process.
Figure 24:
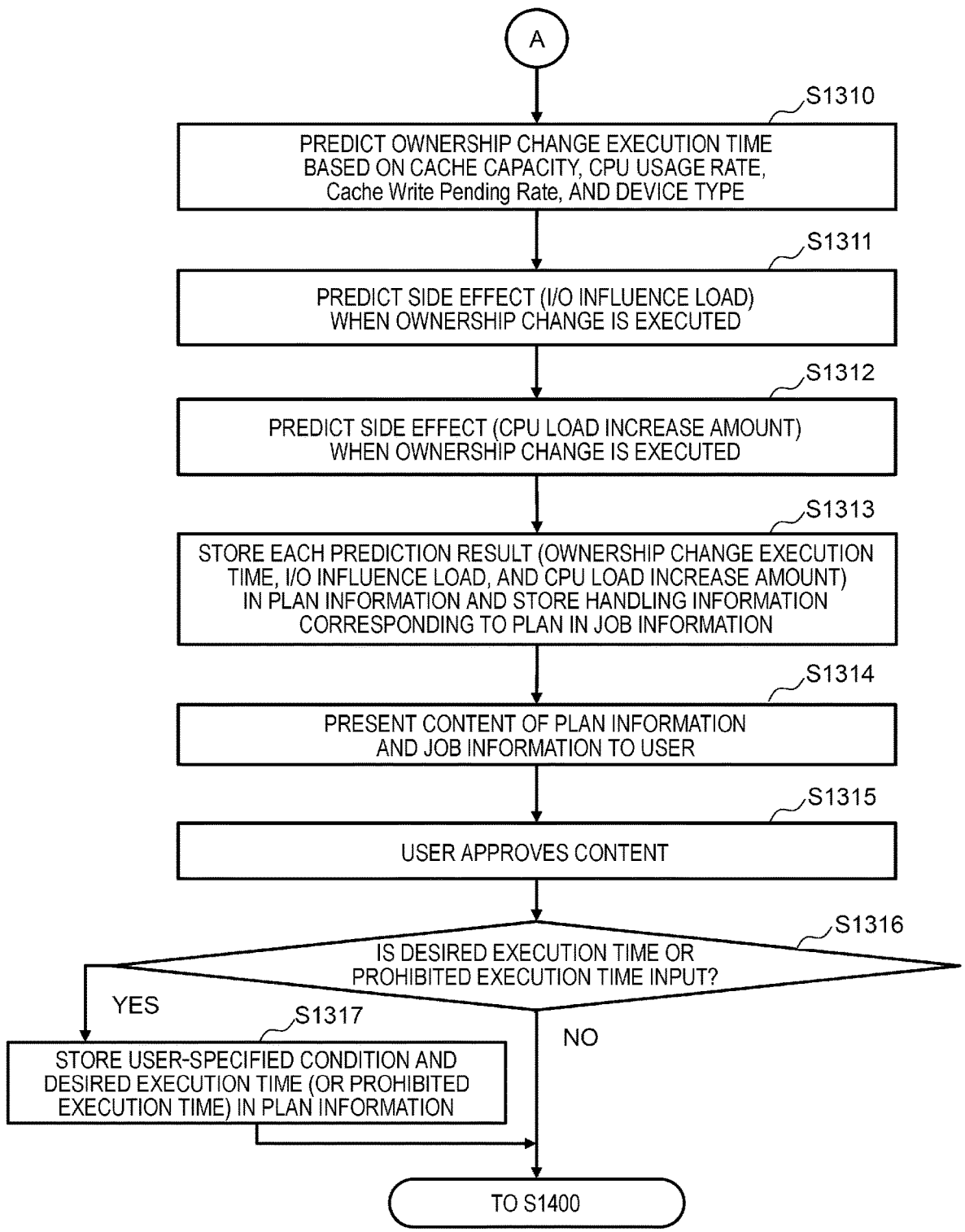
FIG. 24 is a flowchart illustrating a (second) processing procedure example of the plan generation process.

FIGS. 23 and 24 are flowcharts illustrating (first and second) processing procedure examples of the plan generation process. The flowcharts illustrated in FIGS. 23 and 24 illustrate specific processing procedure examples of the plan generation process of Step S1300 illustrated in FIG. 20.

According to FIGS. 23 and 24, the plan generation unit 214 first acquires information of the anomaly generation time 22707 and the usage rate 22708 from the performance anomaly history information 227 (Step S1301). The process of Step S1301 is to acquire the generation time of the event and the CPU usage rate during event generation which are detected in the detection processes of Step S1200. Accordingly, as the period to acquire the information in Step S1301, if the plan generation process starts in an event driven manner after the event detection, the time from the current time to the time retroactive by the detection period set in the detection period 22607 of the detection information 226 may be the target period. In addition, if the generated plan is presented to the user, approved by the user, and then executed, the time from the approval time of the user to the current time is set as the target period, but the time from the approval time of the user to the time retroactive by the detection period from the event detection time may be set as the target period. For example, if the plan generation process starts in an event driven manner after the event detection, the plan is generated based on anomaly history information of five days before from 8 o'clock on January 10 (8 o'clock on January 5) which may use the anomaly history information from the current time to the time retroactive by the detection period of the detection information 226. This period necessarily includes 30 times of anomaly information. If the plan generation is presented to the user, and the execution is performed after the approval of the user, anomaly history information from the approval time of the user to the time retroactive by the detection period may be used. The plan is generated based on the anomaly history information before five days from 8 o'clock on January 11 (8 o'clock on January 6). It is likely that the anomaly information is not 30 times in this period. In consideration that the approval time of the user is the plan generation time and that the newest operation information is to be referred to, the plan is generated based on the operation information of the time before five days from the user approval time. The anomaly history information from the approval time of the user to the time retroactive by the detection period from the event detection time may be used. The plan is generated based on the anomaly history information from 8 o'clock on January 11 to 8 o'clock on January 5. The time becomes the OR time of the both (it is assumed that the user generally determines and approves the plan within five days from the notification). The plan is generated with the newest operation information until the time when the user makes an approval, in addition to the operation information of the period when the anomaly is detected.

Subsequently, the plan generation unit 214 calculates the time average of the CPU usage rate at the one or more items of anomaly generation time acquired in Step S1301 (Step S1302).

Subsequently, the plan generation unit 214 acquires the time information from the performance anomaly history information 227 (anomaly generation time) and operation information for each volume in a higher rank at the anomaly generation time from the operation history ranking information 225 (Step S1303).

Subsequently, the plan generation unit 214 refers to the attribute 22308 of the device configuration information 223, checks the presence or absence of the volume of which the ownership cannot be changed, and excludes a volume from candidates of the plan if the volume of which the ownership cannot be changed is present (Step S1304). Specifically, for example, with respect to the volume that is used for special application in the storage device 1 and is not used for storing the user data, the attribute of which ownership cannot be changed is attached, and thus the attribute of which ownership cannot be changed is checked in Step S1304, so that the volume 18 that cannot be subjected to the ownership change process is excluded from the candidates of the plans.

Subsequently, the plan generation unit 214 is scored by totaling the values of the loads at the time when each volume enters a higher rank (Step S1305). In the case of the copy configuration, the performance may improve if the same copy pair volume is handled with the same ownership, and thus the volume of a copy pair may be regarded as one volume in a group. If a portion of the volume is out of the rank (missing), it is considered that the contribution to the excess of the threshold value is small, and thus the value of the load may be regarded as zero.

Subsequently, the plan generation unit 214 refers to the performance anomaly history information 227 and excludes the CPU in which the anomaly is generated during the detection period (for example, five days) of which the event of the plan target is detected from the ownership change target candidates (Step S1306).

Subsequently, the plan generation unit 214 assumes that the CPU with the lower usage rate to be the ownership change destination in an order from the higher volume with respect to the volume of the higher scores, the process of predicting how the usage rates in the change source CPU and the change destination CPU increase or decrease when the ownership of the corresponding volume is changed is repeatedly executed until the CPU usage rate of the prediction result becomes the criteria or lower (Step S1307). That is, in Step S1307, in an order from the volume of the higher score, the change prediction of the CPU usage rate when the ownership is change is repeated, and at the time point when it is estimated that the CPU usage rate achieves the criteria value or lower, the repetition is ended. Also, even if the repetition is ended with respect to all the volumes, the CPU usage rate cannot achieve the criteria value or lower.

In the process of Step S1307, as the load of the volume to be increased or decreased during the ownership change, the maximum value at the detection point in the past is adopted. The reason for adopting the maximum value is that it is likely that the performance value may fluctuate with time, and it is likely that the detected maximum value is generated at other time. The usage rate for each volume recorded on the use rate ranking (UsageRanking) for each CPU may not be related with the background process of the copy system. The load that is not directly related with the volume and influenced by the ownership change may be estimated from the I/O amounts (values of I/O metric) or the usage rates for each volume described in the operation history information 224.

The method of considering the change destination CPU and the volume of the change target is not limited to the method described above. For example, with respect to the volume with the copy configuration having high risks of which the performance prediction is deviated, a method of decreasing the change priority, generating the change plan from the normal volume with the higher score, and changing also the volume with the copy configuration only when the usage rate cannot be the criteria value or lower only by changing the normal volumes may be used. The method may not be a method of calculating the usage rate based on the increase or decrease of the usage rate simply but may be a method of including a model of a relationship between the I/O amount and the usage rate, predicting the I/O performance of the volume after change by the ownership change and calculating the usage rate after the change based on the prediction result thereof and the model of the relationship between the I/O amount and the usage rate.

After the processing of Step S1307 is completed, the plan generation unit 214 determines whether the change destination CPU and the volume that makes the CPU usage rate to be the criteria value or lower in Step S1307 can be determined (Step S1308). In other words, a case where the prediction result of the CPU usage rate can be the criteria value or lower by the repeated process in Step S1307 means that a proper plan for dealing with the event can be generated, and thus whether the plan can be generated is determined in Step S1308. If the CPU and the volume for achieving the criteria value or lower in Step S1308 cannot be determined, that is, if the plan cannot be generated (NO in Step S1308), the process proceeds to Step S1309.

In Step S1309, the result that the plan for dealing with the event by the processes of Steps S1301 to S1308 cannot be generated is obtained, and thus the plan generation unit 214 (or may be the plan presentation and correction unit 215 or the like) notifies that performance anomaly (event) generated at this time cannot be resolved by the ownership change in the system, to the user (administrator), with GUI or the like and ends the plan generation process.

Meanwhile, if the CPU and the volume that can achieve the criteria value or lower can be determined in Step S1308, that is, if the plan can be generated (YES in Step S1308), the process proceeds to Step S1310 of FIG. 24.

In Step S1310, the plan generation unit 214 predicts the ownership change execution time based on the cache capacity, the CPU usage rate, the "WritePendingRate" of the cache, and the device type (specification information of each device related with the device type). The process is specifically described below.

The ownership change execution time is determined by the configuration change request reception time and the processing time for periodically updating the cache management information 128 (time for migrating the management pointer information of the cache memory 16).

The processing time for periodically updating the cache management information 128 is proportional to the cache capacity and "WritePendingRate" and is inversely proportional to the margin of the CPU usage rate (operating time ratio) and the hardware specification of the device. Dirty areas are always scanned for the cache management (including the migration process) on the background. Since the scanning process and the ownership change process are executed asynchronously, in the scanning process currently performed, the cache area of the migration target may have already passed. Therefore, the time of two weeks for scanning is estimated to ensure that the scan is performed. The time for the configuration change request is determined based on the number of volumes to be changed. Based on the above, the ownership change execution time can be predicted according to Expression 1.

[Expression 1]

$$\text{Execution time} = X^* \text{the number of volumes} + \text{cache capacity} * \text{WritePendingRate}/(Y^* \text{operating time ratio})$$

(Expression 1)

Here, X is request execution time, Y is processing speed for each dirty capacity unique to the device type, and each is determined by the storage device type. The operating time ratio is determined by "(100−CPU usage rate) [%]".

Subsequently, the plan generation unit 214 predicts the predicted value of the influence on I/O (I/O influence load) as one of the side effects when ownership is changed according to the plan (during the execution) (Step S1311). For example, the method of estimating the I/O influence load may be a fixed value in consideration of the value measured in advance or may be derived using a model generated from the measured value. In addition, it may be learned and predicted based on the actual results of the I/O influence load at the time of changing the ownership in the past.

Subsequently, the plan generation unit 214 predicts the predicted value of the influence on the CPU 11 by the increase amount of the CPU load (CPU load increase amount) as one of the side effects when the ownership is changed according to the plan (during the execution) (Step S1312). For example, the method of estimating the CPU load may be a fixed value in consideration of the value measured in advance or may be derived using a model generated from the measured value. In addition, it may be learned and predicted based on the actual results of the CPU load at the time of changing the ownership in the past. The order of executing Steps S1311 and S1312 may be substituted.

Subsequently, the plan generation unit 214 stores the prediction results of Steps S1310 to S1312 in the plan information 229 and stores the information relating to the handling corresponding to the plan in the job information 230 (Step S1313). Specifically, with respect to the plan information 229, the plan generation unit 214 stores the ownership change execution time predicted in Step S1310 in the predicted processing time 22908, the I/O influence load predicted in Step S1311 in the I/O influence prediction 22909, and the CPU load increase amount predicted in Step S1312 in the CPU influence prediction 22910, respectively. With respect to the job information 230, the plan generation unit 214 stores the handling content in the plan (for example, "ownership change") in the handling name 23005, the identifier of the CPU 11 of the change source of the ownership in the corresponding plan in the change source CPU 23006, the identifiers of the volume 18 to be the target of the ownership change in the plan in the change target volume 23007, and the identifier of the CPU 11 of the change destination of the ownership in the corresponding plan in the change destination CPU 23008, respectively. The specific description is omitted, but the plan generation unit 214 in Step S1313 may register appropriate information on items other than the above items (device serial number, device model, and the like) with respect to the plan information 229 and the job information 230.

Subsequently, the plan presentation and correction unit 215 presents the contents of the plan information 229 and the job information 230 to the user (administrator) with GUI or the like (Step S1314). In Step S1314, any kind of information registered on the plan information 229 and the job information 230 up to Step S1314 with respect to the plans for dealing with the events may be presented.

Then, if the user (administrator) approves the content of the plan upon receiving of the presentation in Step S1314 (Step S1315), the process proceeds to Step S1316.

When approval is obtained from the user in step S1315 (or may be the presentation timing in step S1314), the plan presentation and correction unit 215 presents an I/F capable of inputting the user's desire with respect to the execution time of the plan. By performing appropriately input handling on this presented I/F as required, the user can specify the time when the execution of the plan is desired (desired execution time) or the time when the execution of the plan is prohibited (prohibited execution time).

In Step S1316, the plan presentation and correction unit 215 determines whether the desired execution time or the prohibited execution time is input (specified) from the user (administrator) in Step S1315. If an affirmative result is obtained in Step S1316, that is, the desired execution time or the prohibited execution time is input (YES in Step S1316), the process proceeds to Step S1317. Meanwhile, if a negative result is obtained in Step S1316, that is, none of the desired execution time or the prohibited execution time is input (NO in Step S1316), the plan generation process ends, and the process shifts to the plan execution process of Step S1400.

In Step S1317, the plan presentation and correction unit 215 stores the information corresponding to the content specified from the user in the user-specified conditions 22911, the scheduled execution time 22912, or the prohibited execution time 22913 of the plan information 229. Additionally, if the desired execution time is specified from the user, the specified time is registered in the scheduled execution time 22912. Then, if Step S1317 is completed, the plan generation process ends and shifts to the plan execution process of Step S1400.

As a modification example of the processing procedure of the plan generation process illustrated in FIGS. 23 and 24, Steps S1315 to S1317 are omitted, and the computer system 100 (mainly the management server 2) may automatically advance the processes.

(1-4-4) Plan Execution Process

Figure 25:
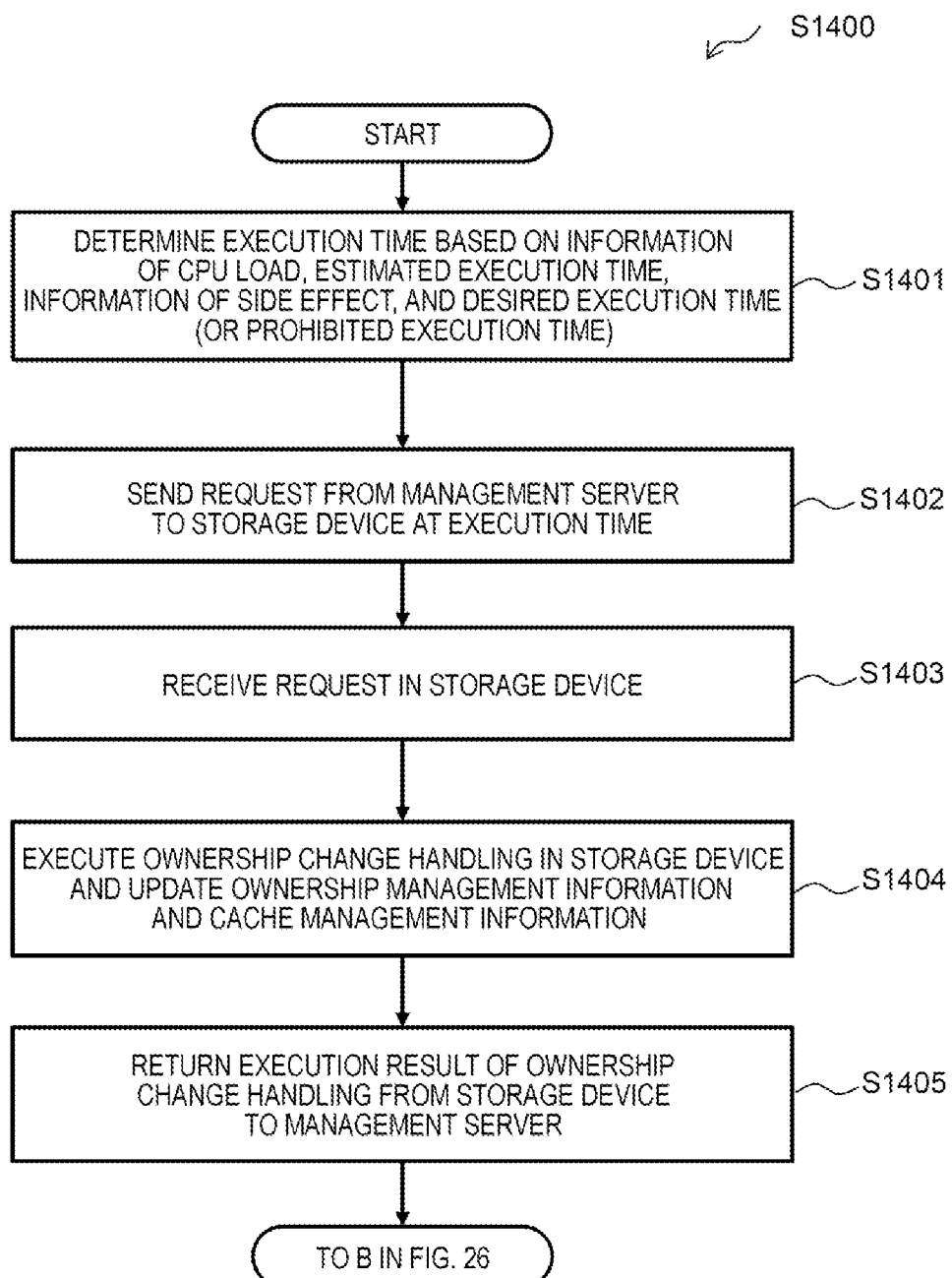
FIG. 25 is a flowchart illustrating a (first) processing procedure example of a plan execution process.
Figure 26:
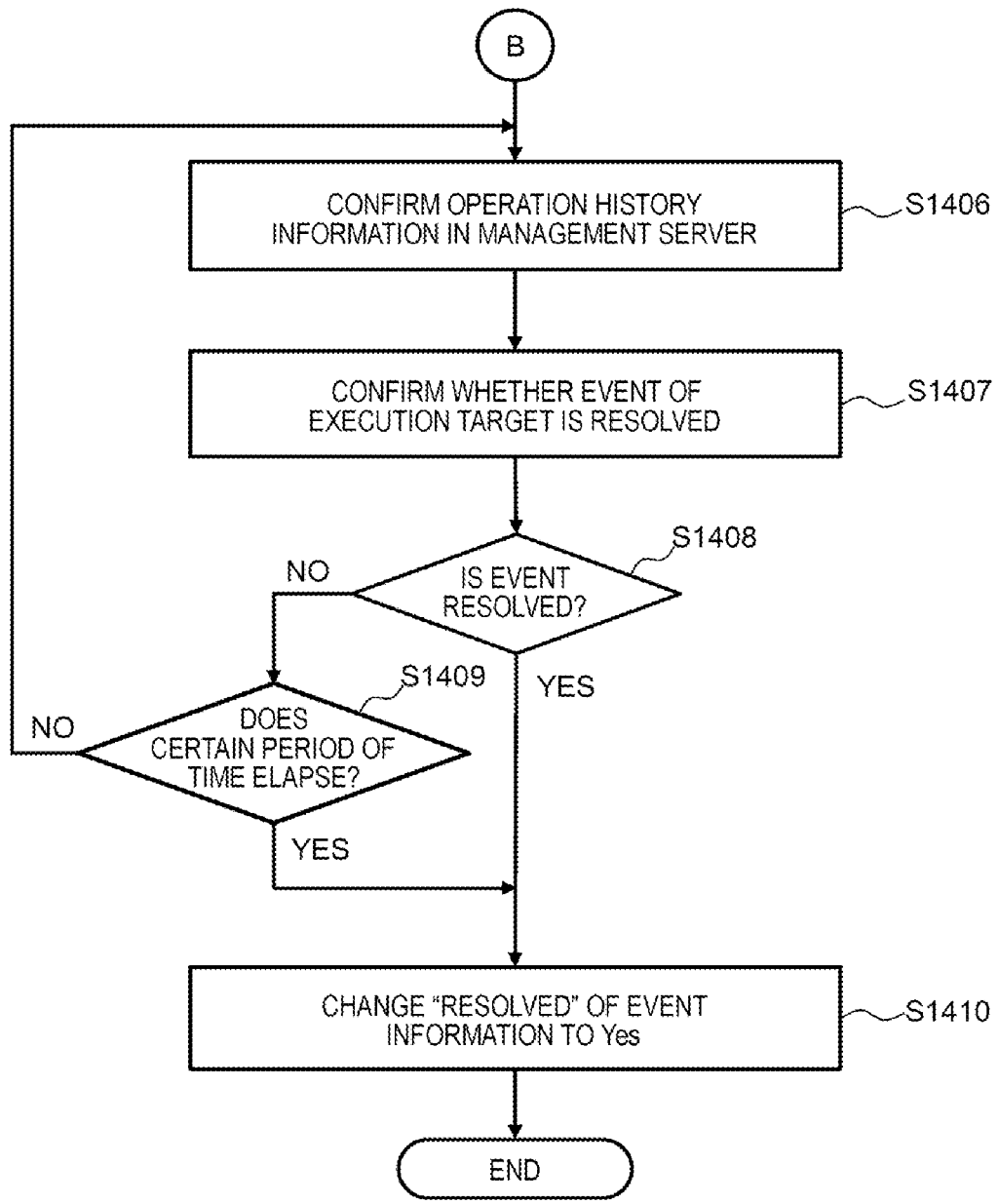
FIG. 26 is a flowchart illustrating a (second) processing procedure example of the plan execution process.

FIGS. 25 and 26 are flowcharts illustrating (first and second) processing procedure examples of the plan execution process. The flowcharts illustrated in FIGS. 25 and 26 illustrate a specific processing procedure example of the plan execution process of Step S1400 illustrated in FIG. 20.

According to FIGS. 25 and 26, the plan execution unit 216 first determines the execution time of the plan based on the information of the CPU load, the execution prediction time (ownership change execution time), the information on the side effects, the desired execution time or the prohibited execution time specified by the user (Step S1401).

The method of determining the execution time of the plan in Step S1401 is specifically described. If the desired execution time is specified by the user (administrator) (if the scheduled execution time 22912 is registered on "desired time" as the user-specified condition 22911 of the plan information 229), the desired execution time registered on the scheduled execution time 22912 may be determined as the execution time of the plan. In this case, the plan execution unit 216 is not required to update the scheduled execution time 22912 of the plan information 229.

Meanwhile, if the prohibited execution time is set (if the prohibited execution time 22913 is registered on the "prohibited time" as the user-specified condition 22911 of the plan information 229), the plan execution unit 216 determines the execution time of the plan avoiding the prohibited execution time (may also be a time zone) registered in the prohibited execution time 22913 registered on the scheduled execution time 22912 of the plan information 229. Specifically, the time may be determined by the following determination method. For example, if the execution may be performed at the time when the CPU load becomes lower than a certain value. In view of the history of the CPU load for a certain period in the past, the time when the load decreases may be predicted to determine the execution time from the execution prediction time and the side effects (I/O influence and CPU load increase) during the time. In addition, the CPU load in the future is predicted by learning the history information in the past, and the execution time may be determined from the execution prediction time and the side effects during the time.

After the end of Step S1401, at the execution time of the plan, the plan execution unit 216 sends the request of the ownership change process (the content of the job information 230) to the storage device 1 via the management information transceiving and storing unit 211 (Step S1402).

The management information transceiving unit 121 of the storage device 1 receives the request sent in Step S1402 and sends the request to the management handling execution unit 123 (Step S1403).

Subsequently, the management handling execution unit 123 executes the ownership change process according to the request and updates the relationship between the CPU 11 and the volume 18 in the ownership management information 127 and the cache management information 128 after the execution (Step S1404).

Then, the management handling execution unit 123 returns the execution result of the ownership change process to the management server 2 in the cloud via the management information transceiving unit 121 (Step S1405).

Then, the management server 2 performs the processes of Steps S1406 to S1409 by the plan execution completion confirmation unit 217, as the process for confirmation whether the event is resolved by the plan execution of the ownership change process.

First, in Step S1406, the plan execution completion confirmation unit 217 confirms the operation history information 224.

Subsequently, the plan execution completion confirmation unit 217 confirms whether the event is resolved based on the operation history information 224 (Step S1407). For example, as the method of confirming the event resolution, it is confirmed that the event of the execution target becomes in a state in which the anomaly is not detected (in other words, the event is resolved) in the confirmation condition in which the "detection period" is shortened (for example, shortened to one day if the detection period 22607 of the detection information 226 is set to "five days") based on the detection condition used in the event detection in the detection process of Step S1200 (refer to the detection information 226). Also, for example, it is confirmed that the event of the execution target becomes in the state in which the anomaly is not detected (in other words, the event is resolved) in the confirmation condition in which the "detection period" is substituted to "after 24 hours elapses from the day or time when the excess of the threshold value at the nearest previous time is detected" based on the detection condition used in the event detection in the detection process of Step S1200. For example, it may be determined that the event is resolved simply by receiving the completion result of the plan execution.

Subsequently, the plan execution completion confirmation unit 217 determines whether the resolution of the event can be confirmed by the confirmation of Step S1407 (Step S1408). If an affirmative result is obtained in Step S1408, that is, if the resolution of the event can be confirmed (YES in Step S1408), the process proceeds to Step S1410. If negative result is obtained in Step S1408, that is, if the resolution of the event cannot be confirmed (NO in Step S1408), the process proceeds to Step S1409.

In Step S1409, the plan execution completion confirmation unit 217 confirms whether a certain period of time elapses after the plan execution. Here, the certain period of time may be considered as the "detection period" that configures the confirmation condition described in the method of confirming the event resolution in Step S1407. That is, "detection period" or "after 24 hours elapses from the day or time when the excess of the threshold value at the nearest previous time is detected" changed from the source detection condition may be used as "a certain period", and if the certain period does not elapse (NO in Step S1409), the process returns to Step S1406, the confirmation of the event resolution is repeated based on the latest operation history information 224. Meanwhile, if a certain period elapses (YES in Step S1409), the plan execution completion confirmation unit 217 considers that the event ends (resolved), and the process proceeds to Step S1410.

Then, in Step S1410, the plan execution completion confirmation unit 217 changes the resolution completion 22807 of the event information 228 to "Yes" and ends the plan execution process.

As described above, according to the computer system 100 of the present embodiment, if the imbalance of the CPU usage rate is generated in the plurality of storage devices 1 managed by a certain data center 3 or organization, the information is collected, the generation of the imbalance is detected, and a plan for resolving the detected imbalance is generated, so that the plan can be executed. During the plan generation, the execution time of the processing can be determined in consideration of the prediction of the processing time, the influence on I/O, and the influence of the CPU load itself as the influence on the ownership change process, and the execution time of the processing can be determined in consideration of the influence on the application or the operation of the user by receiving the desired execution time or the prohibited execution time from the user. According to the computer system 100 of the present embodiment, if there is an imbalance of the load in the CPU 11 of the storage device 1, the process for changing the ownership can be executed by reducing the influence applied to the operation, and thus it is possible to detect and deal with the risk of performance instability that may occur in the future in the storage device 1 at an early stage to decrease the management cost of the administrator.

According to the present embodiment, a case where the ownership of the CPU 11 with respect to the volume 18 in one storage device 1 in the computer system 100 is changed is described, but the present invention is not limited to the ownership change in one storage device 1. For example, as a modification example of the present embodiment, even in the configuration in which the computer system includes a plurality of storage devices (storage nodes), if data of the memory and the cache memory is shared and shown to the user as one storage device, the present invention can be applied in the same manner as in the present embodiment.

(2) Second Embodiment

According to the second embodiment, as the difference from the first embodiment, the ownership change in the configuration in which one cluster is configured with a plurality of storage nodes, and data of the memory and the cache memory is not shared between the storage nodes thereof is described. Hereinafter, according to the second embodiment, only the difference from the first embodiment is described, and the same reference numerals will be given to overlapping configurations and processes, and the description thereof is omitted.

(2-1) Configuration

Figure 27:
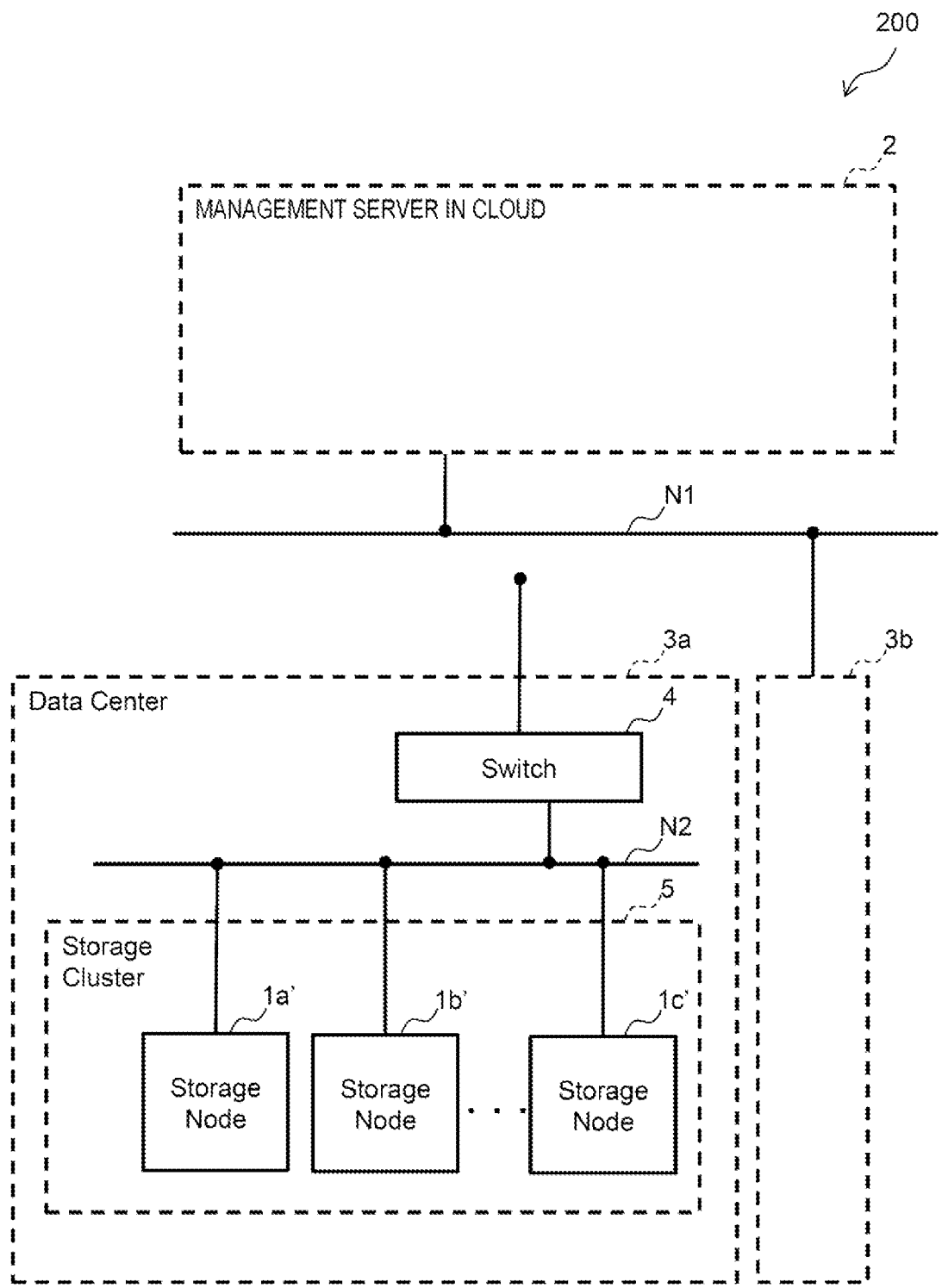
FIG. 27 is a diagram illustrating an overall configuration example of a computer system 200 according to a second embodiment of the present invention.

FIG. 27 is a diagram illustrating an overall configuration example of a computer system 200 according to the second embodiment of the present invention. In the computer system 200, as the difference from the overall configuration of the computer system 100 according to the first embodiment illustrated in FIG. 2, in each of the data centers 3, the storage devices 1a, 1b, and 1c become the storage nodes 1a', 1b', and 1c', and there is a storage cluster 5 that bundles the plurality of storage nodes 1', respectively.

In the computer system 200, the configuration of the storage nodes 1' are the same as the storage devices 1 illustrated in FIG. 3. Depending on the specifications of the storage cluster 5, the pools 17a and 17b and the volumes 18a, 18b, and 18c may be configured to be closed in the storage node or configured to cover the storage nodes. The present embodiment can be applied to any of the above configurations, and thus the configuration of the storage node 1' is not illustrated.

The program or the table that operates on each memory of the storage nodes 1' (individually the storage nodes 1a', 1b', and 1c') may store the individual information in each storage node, or there may be a representative node, and all programs or tables are stored on the memory of the representative node. For the sake of simplicity, the present embodiment is described in the form in which there is a representative node. According to the second embodiment, the memory of the storage node 1' or the management server 2 in the cloud stores the same programs and information (table) as illustrated in FIG. 4 or 5 according to the first embodiment. With respect to the information (table) of the second embodiment that includes the difference from the first embodiment, an apostrophe """ is added to the reference numeral defined in the first embodiment. Specifically, the configuration information 126 is referred to as configuration information 126', and the device configuration information 223 is referred to as device configuration information 223'.

FIG. 28 is a diagram illustrating an example of the configuration information 126' according to the second embodiment. The configuration information 126' is a table that stores the configuration information of the storage nodes 1a', 1b', and 1c' and manages device serial numbers 12601' indicating the product serial numbers for identifying the storage nodes 1', device models 12602' indicating the models (types) of the storage nodes 1', resource types 12603' indicating the type information of the resources included in the storage nodes 1', resource IDs 12604' indicating the identifiers of the resources, related resources 12605' indicating relationship between resources, specifications 12606' indicating specification (sizes, speeds, and the like) of the resource, and attributes 12607' indicating the attribute information of the resources of each storage node 1'.

The difference of the configuration information 126' from the configuration information 126 according to the first embodiment is that "Node" is added to the resource types 12603' of the management target, and the information of the nodes are set in the related resources 12605', if the resource type 12603' is CPU, Cache, Port, or Drive. According to the specification of the storage cluster 5, the pools or the volumes may not cover the storage nodes, and thus, in that case, the information of the nodes may be set in the related resources 12605' of the pools or the volumes.

FIG. 29 is a diagram illustrating an example of the device configuration information 223' according to the second embodiment. The device configuration information 223' stores organization IDs 22301' indicating the identifiers of the organizations that store or manage the storage nodes 1', device serial numbers 22302' indicating the product serial numbers of the storage nodes 1', device models 22303' indicating the models (types) of the storage nodes 1', resource types 22304' indicating the type information included in the storage nodes 1', resource IDs 22305' indicating the identifiers of the resources, related resources 22306' indicating the relationship between resources, specifications 22307' indicating the specification (sizes, speeds, and the like) of the resources, and attributes 22308' indicating the attribute information of the resources in the storage nodes 1'.

The difference of the device configuration information 223' from the device configuration information 223 according to the first embodiment is that the information relating to the storage nodes 1' is added in the same manner as in the configuration information 126' illustrated in FIG. 28. The specific contents of the difference are the same as the configuration information 126' of FIG. 28, and thus the description thereof is omitted.

(2-2) Process

Processes executed in the computer system 200 according to the second embodiment are described. The processing flow according to the second embodiment is a flow forming an information collection process, a detection process, a plan generation process, and a plan execution process in the same manner as in the processing flow illustrated in FIG. 20 according to the first embodiment. As the difference from the first embodiment, the contents of the memories and the cache memories in each of the storage nodes 1' are not shared, it is required to copy cache data between the nodes at the time of the ownership change, and it is required to migrate the volumes since the effect of the caches covering the nodes disappears. Therefore, according to the second embodiment, the process of predicting the influence during the plan generation is different from that according to the first embodiment.

Figure 30:
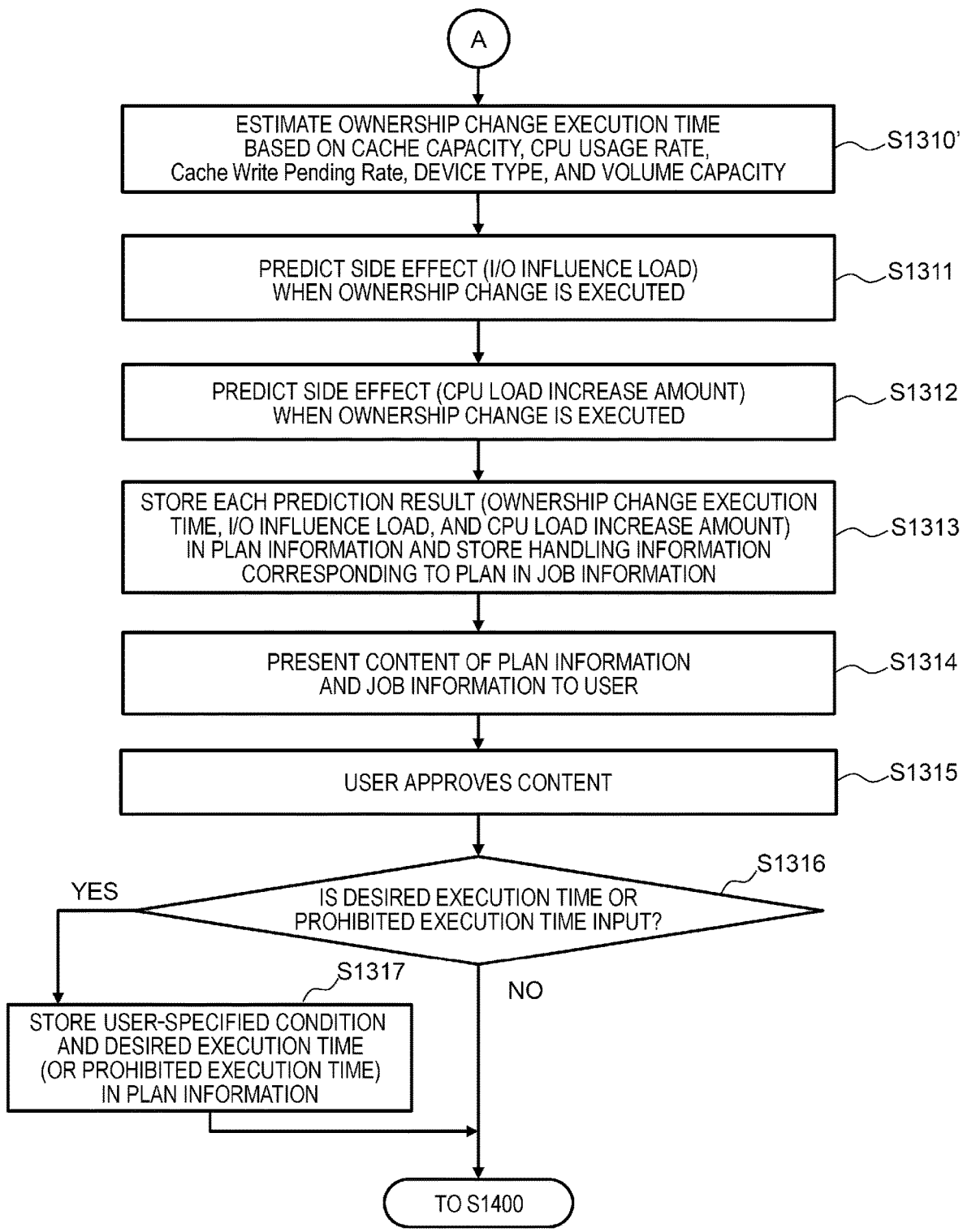
FIG. 30 is a flowchart illustrating a processing procedure example of a plan generation process according to the second embodiment.

FIG. 30 is a flowchart illustrating a processing procedure example of the plan generation process according to the second embodiment. The flowchart illustrated in FIG. 30 corresponds to the latter half of the plan generation process and is substituted to the processing flow of FIG. in the processing procedure of the plan generation process according to the first embodiment illustrated in FIGS. 23 and 24. In addition, the processing flow illustrated in FIG. 30 is different in that Step S1310 illustrated in FIG. 24 is substituted to Step S1310'.

As illustrated in FIG. 30, in Step S1310', the plan generation unit 214 predicts the ownership change execution time based on the cache capacity, the CPU usage rate of the change destination storage node, WritePendingRate of the cache of the change destination storage node, the volume capacity, and the device type (specification information of each device related from the device type). Details thereof are described below.

The ownership change execution time is determined by the configuration change request reception time, the processing time (migration time of the management pointer information of the cache memory) that periodically updates the cache management information 128, the time when the cache data is copied, and the time when the volume is migrated.

The processing time for periodically updating the cache management information 128 is proportional to the cache capacity, WritePendingRate of the change destination storage node, and the volume capacity, and inversely proportional to the margin of the CPU usage rate (operating time ratio) of the change destination storage node, and the hardware specification of the device. Dirty areas are always scanned for the cache management (including the migration process) on the background. Since the scanning process and the ownership change process are executed asynchronously, in the scanning process currently performed, the cache area of the migration target may have already passed. Therefore, the time of two weeks for scanning is estimated to ensure that the scan is performed. The time for the configuration change request is determined based on the number of volumes to be migrated. Based on the above, the ownership change execution time can be predicted according to Expression 2.

[Expression 2]

$$\text{Execution time} = X' * \text{the number of volumes} + \text{cache capacity} * \text{WritePendingRate}/(Y' * \text{operating time ratio}) + (\text{total capacity of migrated volumes} + \text{capacity of cache used by migrated volumes})/z \quad \text{(Expression 2)}$$

Here, X' is request execution time, Y' is processing speed for each dirty capacity unique to the device type, Z is the processing speed for each data copy capacity unique to the device type, and each is determined by the device type of the storage node. The operating time ratio is determined by "(100−CPU usage rate) [%]". The capacity of the cache used by the migrated volume is obtained from the number of the management pointers of the cache management information 128 (the cache management pointers 12803) (refer to FIG. 9).

According to the computer system 200 of the second embodiment, even if the data of the memory and the cache memory is not configured to be shared as in the computer system 100 according to the first embodiment, if the imbalance of the CPU usage rate is generated in the storage cluster 5 in which the memories or the cache memories are not shared between the plurality of storage nodes 1', the information thereof is collected, the generation of the imbalance is detected, a plan for resolving the detected imbalance is generated, so that the plan can be executed.

During the plan generation, the execution time of the processing can be determined in consideration of the prediction of the processing time, the influence on I/O, and the influence of the CPU load itself as the influence on the ownership change process, and the execution time of the processing can be determined in consideration of the influence on the application or the operation of the user by receiving the desired execution time or the prohibited execution time from the user. According to the computer system 200 of the present embodiment, if there is an imbalance of the load in the CPU of the storage node 1', the process for changing the ownership can be executed by reducing the influence applied to the operation, and thus it is possible to detect and deal with the risk of performance instability that may occur in the future in the storage nodes 1' at an early stage to decrease the management cost of the administrator.

The present invention is not limited to each of the above embodiments, and includes various modification examples. For example, according to the first embodiment, all the management programs are present on the cloud, but may be present in a memory on a management server not in the cloud in or outside the data center.

In addition, the above embodiments are described in detail for easier understanding of the present invention and are not necessarily limited to include all the described configurations. Further, as long as there is no contradiction, it is possible to replace a part of the configuration of one embodiment with the configuration of another embodiment and add a configuration of another embodiment to a configuration of a certain embodiment. In addition, it is possible to add, delete, replace, integrate, or distribute a configuration with respect to a part of the configuration of each embodiment. Further, the configurations and processes described in the embodiments can be appropriately dispersed, integrated, or replaced based on the processing efficiency or the mounting efficiency.

In addition, control lines and information lines are illustrated in the drawings as necessary for explanation, and not all control lines and information lines are provided in the product. In practice, it may be considered that almost all configurations are interconnected.

What is claimed is:

1. A computer system comprising:
   a plurality of storage devices storing data;
   a plurality of processors; and
   a management unit,
   wherein:
   the computer system includes operation history information including a load of the processors and volumes at each time;
   the processor provides a volume to which a storage area of the storage device has been assigned and processes data that is input/output via the volume;
   the processor to handle the volume is prescribed; and
   the management unit:
   determines a volume, a migration source processor and a migration destination processor to be used for migrating the volume between the processors based on the load of the processors and the volume in the operation history information;
   determines an execution time of migrating the volume between the determined processors based on the load of the processors and the volume at each time in the operation history information; and
   performs control so that the volume is migrated between the processors at the determined execution time.

2. The computer system according to claim 1, wherein the management unit:
   calculates a time required for migrating the volume; and
   determines the execution time of migrating the volume between the determined processors based on the time required and the load of the processors and the volume at each time in the operation history information.

3. The computer system according to claim 2, wherein the time required is calculated based on a load of the CPU, a status of use of a cache memory used by the CPU and a performance of hardware configuring the computer system.

4. The computer system according to claim 2, wherein the management unit:
   calculates side effect information upon executing the migration of the volume; and
   determines the execution time of migrating the volume between the determined processors based on the side effect information, the time required and the load of the processors and the volume at each time in the operation history information.

5. The computer system according to claim 4, wherein the side effect information includes an influence on input and output of data upon executing the migration of the volume.

6. The computer system according to claim 4, wherein the side effect information includes an increase value of the CPU load upon executing the migration of the volume.

7. The computer system according to claim 4, wherein:
   the volume to be the migrated, the migration source processor and the migration destination processor, the side effect information, and the time required are presented;

a desired execution time or a prohibited execution time of the migration of the volume is accepted; and the execution time of migrating the volume between the processors is determined by giving consideration to the desired execution time or the prohibited execution time that is input.

8. The computer system according to claim 1, wherein the management unit:

determines the migration source processor to become a migration source of the volume based on a load obtained by averaging, in terms of time, the load of the processor at each time; and determines the volume to be migrated based on the load of the volume at each time which is operating on the migration source processor.

9. The computer system according to claim 8, wherein:

each of the processors includes operation history information including a load of the processors and volumes at each time, and sends, to the management unit, a load obtained by averaging, in terms of time, the load of the processor at each time; and the processor determined as the migration source processor sends, to the management unit, a load of the migration source processor and the volume operating thereon at each time which has not been averaged.

10. A method of managing a computer system comprising:

a plurality of storage devices storing data;

a plurality of processors; and a management unit, wherein: the computer system includes operation history information including a load of the processors and volumes at each time;

the processor provides a volume to which a storage area of the storage device has been assigned and processes data that is input/output via the volume;

the processor to handle the volume is prescribed; and the management unit:

determines a volume, a migration source processor and a migration destination processor to be used for migrating the volume between the processors based on the load of the processors and the volume in the operation history information;

determines an execution time of migrating the volume between the determined processors based on the load of the processors and the volume at each time in the operation history information; and performs control so that the volume is migrated between the processors at the determined execution time.

* * * * *